US012666505B2

(12) United States Patent
Shin et al.

(10) Patent No.: US 12,666,505 B2
(45) **Date of Patent: *Jun. 23, 2026**

(54) DOOR OPENING SPEED CONTROLLER AND AUTOMATIC OPENING STRUCTURE FOR AN APPLIANCE

(71) Applicant: LG ELECTRONICS INC., Seoul (KR)

(72) Inventors: Jangmo Shin, Seoul (KR); Jeongkil Kim, Seoul (KR); Myeong Jun Shin, Seoul (KR); Seongho Jeong, Seoul (KR); Sangki Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

This patent is subject to a terminal disclaimer.

(21) Appl. No.: 18/226,061

(22) Filed: Jul. 25, 2023

(65) Prior Publication Data

US 2023/0371141 A1 Nov. 16, 2023

Related U.S. Application Data

(63) Continuation of application No. 17/397,070, filed on Aug. 9, 2021, now Pat. No. 11,751,294, which is a (Continued)

(30) Foreign Application Priority Data

Mar. 27, 2018 (KR) ........................ 10-2018-0035257
Apr. 2, 2018 (KR) ........................ 10-2018-0038379
Apr. 11, 2018 (KR) ........................ 10-2018-0042414

(51) Int. Cl.
*H05B 6/64* (2006.01)
*E05B 15/02* (2006.01)
(Continued)

(52) U.S. Cl.
CPC ......... *H05B 6/6417* (2013.01); *E05B 15/022* (2013.01); *E05B 15/1635* (2013.01);
(Continued)

(58) Field of Classification Search
CPC ............... E05B 15/022; E05B 15/1635; E05B 2047/0068; E05B 47/0012; E05B 47/0046;
(Continued)

(56) References Cited

U.S. PATENT DOCUMENTS 4,982,063 A 1/1991 Tsunekawa et al.
2003/0056328 A1 3/2003 Habegger et al.
(Continued)

FOREIGN PATENT DOCUMENTS

CN 104968881 A 10/2015
CN 106812393 A 6/2017
(Continued)

*Primary Examiner* — Michael G Hoang
*Assistant Examiner* — Logan P Jones
(74) *Attorney, Agent, or Firm* — Bryan Cave Leighton Paisner LLP

(57) ABSTRACT

An appliance includes a hinge module between a main body and a pull-down door. The hinge module includes a housing, a rotational axis member disposed in the housing serving as a center of rotation between the pull-down door and the main body, an inner link housing movably disposed in the housing that moves with the opening of the pull-down door in a direction of the rotational axis member, and a damper installed in the inner link housing, the damper including a piston and a cylinder and providing damping force according to a relative movement of the piston and the cylinder. Any one of the piston and the cylinder of the damper moves with the inner link housing and the other of the piston and the cylinder of the damper moves by a predetermined distance as the inner link housing moves and then is inter-
(Continued)

fered by the housing so as not to move further, and the piston and the cylinder of the damper starts damping, wherein the predetermined distance corresponds to an opening angle of the pull-down door in which the damping is started.

20 Claims, 20 Drawing Sheets

Related U.S. Application Data continuation of application No. 16/366,594, filed on Mar. 27, 2019, now Pat. No. 11,116,049.

(51) Int. Cl.

| | |
|---|---|
| ***E05B 15/16*** | (2006.01) |
| ***E05B 47/00*** | (2006.01) |
| ***E05C 19/12*** | (2006.01) |
| ***E05F 1/12*** | (2006.01) |
| ***E05F 3/02*** | (2006.01) |
| ***E05F 3/18*** | (2006.01) |
| ***E05F 3/20*** | (2006.01) |
| ***E05F 3/22*** | (2006.01) |
| ***F24C 15/02*** | (2006.01) |

(52) U.S. Cl.

CPC ...... *E05B 47/0012* (2013.01); *E05B 47/0046* (2013.01); *E05C 19/12* (2013.01); *E05F 1/1261* (2013.01); *E05F 1/1276* (2013.01); *E05F 3/02* (2013.01); *E05F 3/18* (2013.01); *E05F 3/20* (2013.01); *E05F 3/224* (2013.01); *F24C 15/022* (2013.01); *H05B 6/6414* (2013.01); *E05B 2047/0068* (2013.01); *E05Y 2201/21* (2013.01); *E05Y 2201/254* (2013.01); *E05Y 2201/264* (2013.01); *E05Y 2800/26* (2013.01); *E05Y 2900/302* (2013.01); *E05Y 2900/308* (2013.01)

(58) Field of Classification Search

CPC ...... E05C 19/12; E05F 1/1261; E05F 1/1276; E05F 3/02; E05F 3/18; E05F 3/20; E05F 3/224; E05Y 2201/21; E05Y 2201/254; E05Y 2201/264; E05Y 2800/26; E05Y 2900/302; E05Y 2900/308; F24C 15/022; F24C 15/023; H05B 6/6414; H05B 6/6417

See application file for complete search history.

(56) References Cited

U.S. PATENT DOCUMENTS

| | | | | |
|---|---|---|---|---|
| 2008/0078373 A1 | 4/2008 | Kim | F24C 15/022 | 126/192 |
| 2010/0281650 A1* | 11/2010 | Kleemann | E05F 5/02 | 16/64 |
| 2011/0017191 A1 | 1/2011 | White | E05F 5/00 | 126/198 |
| 2012/0067333 A1 | 3/2012 | Mirshekari | E05F 3/14 | 126/192 |
| 2016/0006899 A1 | 1/2016 | Kang | H04N 1/00551 | 358/474 |
| 2017/0159229 A1 | 6/2017 | Park | D06F 39/14 | |
| 2021/0071456 A1* | 3/2021 | Gherardi | E05F 1/1261 | |

FOREIGN PATENT DOCUMENTS

| | | | | | |
|---|---|---|---|---|---|
| CN | 107419986 | A | | 12/2017 | |
| DE | 202007012603 | U1 | | 2/2009 | |
| DE | 102013215211 | A1 | * | 2/2015 | F24C 15/023 |
| EP | 0342307 | A2 | | 11/1989 | |
| EP | 1431671 | A1 | | 6/2004 | |
| EP | 2474786 | A2 | * | 7/2012 | F24C 15/023 |
| EP | 2474786 | B1 | | 7/2012 | |
| EP | 2823124 | B1 | | 1/2015 | |
| GB | 2455783 | A | | 6/2009 | |
| JP | 2002250522 | A | | 9/2002 | |
| JP | 2005326044 | A | | 11/2005 | E05B 17/0029 |
| JP | 2009139020 | A | * | 6/2009 | F24C 15/023 |
| KR | 1020040046467 | A | | 6/2004 | |
| KR | 1020190113071 | A | | 10/2019 | |
| WO | 2005008137 | A1 | | 1/2005 | |
| WO | 2019121391 | A1 | | 6/2019 | |

* cited by examiner

DOOR OPENING SPEED CONTROLLER AND AUTOMATIC OPENING STRUCTURE FOR AN APPLIANCE

CROSS-REFERENCE TO RELATED APPLICATION

This application is a Continuation Application of U.S. patent application Ser. No. 17/397,070, filed on Aug. 9, 2021, which is a Continuation Application of U.S. patent application Ser. No. 16/366,594, filed on Mar. 27, 2019, which claims the benefit of KR Patent Application No. 10-2018-0035257, filed on Mar. 27, 2018, KR Patent Application No. 10-2018-0038379, filed on Apr. 2, 2018, and KR Patent Application No. 10-2018-0042414, filed on Apr. 11, 2018, the contents of which are all hereby incorporated by reference herein in their entirety.

FIELD OF THE DISCLOSURE

The present disclosure relates to a home appliance that has an automatic opening structure to automatically open a door of the home appliance, and a door opening speed controller to control a door opening speed.

BACKGROUND

A cooking appliance such as an oven or a microwave oven has a rectangular cuboid shape and includes a cooking chamber that is opened at the front and a door at the front of the cooking chamber.

A door can open in many different ways. One example is a hinge-coupled door that rotates about a rotational axis to open and close the front of the cooking chamber. The door may have a handle or a groove that can be gripped by a user.

For convenience, a function to automatically open and close a door may be added to a cooking appliance. According to a known automatic door opening structure of a cooking appliance, a high output power driver is used to open a door in order to overcome elasticity that is applied to the door so as to add closing force to the door.

A known driver for supplying opening force to open a door is installed near a rotational shaft of a door which has a narrow space. This narrow space restricts the design and installation of the driver. Additionally, the driver often operates incorrectly because it is exposed to heat in a cooking chamber.

SUMMARY

In U.S. Patent Publication No. 2011-0095019, a controlled door opening structure, in which latches of a swing door are lifted by a cam so as to open a door, is disclosed. Two latches of the swing door are provided in the upper and lower parts of one side of the door and are linked with each other. The latches are connected with each other such that one latch and the other latch can operate simultaneously. The cam for opening the door lifts any one of the two latches, and the lifted latch is pushed forward by an inclined surface provided in the upper part of a latch holder so as to open the door.

However, a structure in which latches are linked with each other is a prerequisite for opening the door. That is, when one latch is lifted, the other latch is also lifted.

Generally, latches on one side of a swing door may be linked with each other without difficulty. However, in the case of a pull-down door, a distance between two latches in the left and right upper parts of the pull-down door of a cooking appliance is longer than that between two latches of the swing door of a cooking appliance. Accordingly, it is not simple to link with each other the latches of a pull-down door of a cooking appliance. For instance. if the two latches are to be linked with each other, a structure of a door for shielding electromagnetic leakage and a structure of a main body for shielding electromagnetic leakage, and the like need to be redesigned. This is a cumbersome process. As a result, a controlled door opening structure in U.S. Patent Publication No. 2011-0095019 is hardly applied to a pull-down door.

In automatic opening structure of a pull-down door, it is desirable that a structure for lifting the left latch and the right latch, respectively, be applied on both sides of a main body of the cooking appliance. However, space on both sides of the main body of the cooking appliance with a pull-down door is smaller than that of a cooking appliance with a swing-type door. Additionally, unless both latches are lifted and unlocked simultaneously, automatic opening of the door may not be smoothly performed.

According to the controlled door opening structure in U.S. Patent Publication No. 2011-0095019, the force of lifting a latch is implemented by means of a cam operation. A cam directly connects to a driving means such as a motor, and the like, and five curved profiles are radially provided in a circumferential surface of the cam. Accordingly, a motor that generates as much power as the driving force of the cam or a speed reducer is required. Additionally, the driving system is very heavy. A heavy driving system is greatly affected by inertial force. Thus, the cam may not stop immediately at the correct position when the profile of the cam has pressed a switch.

If the cam stops in the incorrect position, there may be a problem when the door is closed. That is, even though the latch is inserted into a latch holder when the door is closed, the force that the lower end of a hook of the latch presses against the cam may not be enough to rotate the heavy driving system. As a result, the latch may not be completely mounted onto the latch holder to lock onto the latch holder. This may cause a sensor for sensing whether the door is closed or not to sense that the door is not closed and may cause the cooking appliance to determine that the door is not completely closed and not operate.

Most of the controlled door opening structures include a motor, a cam that is rotated by the motor and a micro switch that is pressed by the cam so as to control the rotational displacement of the motor.

U.S. Pat. No. 7,225,804, a method for monitoring a mechanism for automatically opening a door with a motor driven latch (locking member) is disclosed. The monitoring mechanism confirms whether an oven door locking member is properly in the locked or released position. When sensing that the oven door locking member is in the incorrect position, the monitoring mechanism supplies pulse signals to a motor repeatedly to place the locking member in the correct position.

However, since changes in voltage supplied to the motor may not have been considered, the position of the locking member may not be constant with each single pulse signal of the monitoring mechanism.

Additionally, according to the method, pulse signals are supplied a number of times instead of uninterrupted signals so as to allow the locking member to be placed in the correct position. Thus, much time is spent on sensing failure because there are gaps between signals.

The above-described method for sensing failure is performed apart from the operation of the locking member. Thus, input power for operating the locking member and pulse power for sensing a failure of the locking member are separately used. This makes an electric power source of the cooking appliance complicated.

If a pull-down door automatically opens by means of its self-weight after the pull-down door is unlocked, the opening angle of the door increases as the door opens, and accordingly, the opening force of the door increases proportionally. In a hinge module for controlling the opening speed of a door, a structure in which elasticity is applied in a direction opposite to the direction of the force of the opening door and a structure in which damping force is applied in a direction opposite to the direction of the force of the opening door are combined.

The hinge module is configured to have elasticity and damping force small enough for most people not to feel the self-weight of a door when they open the door. However, in a structure where a door automatically opens from a closed position to a completely opened position, the door opening speed is hardly controlled.

For instance, when the damping force of the door is increased to prevent an increase in the door opening speed, the initial door opening speed is significantly decreased. Conversely, when the damping force of the door is decreased to increase the initial door opening speed, the door swings open with significant force because the applied damping force is overwhelmed by the opening force of the door increasing in accordance with an increasing opening angle of the door.

An view of the exemplary problems described above, the present disclosure provides a home appliance capable of automatically opening a door even though an automatic door opening structure provided with two latches moving independently is applied only to any one latch.

The present disclosure provides a home appliance capable of automatically opening a door with a low power driver.

The present disclosure provides a home appliance that is not affected by heat in a cooking chamber, thereby ensuring a reliable automatic opening.

The present disclosure provides a home appliance that has a structure for automatically opening a door, which is not seen from the outside, thereby ensuring a neat appearance of the home appliance.

The present disclosure provides a door opening speed controller capable of controlling door opening speed in an automatic door opening structure in which the wider the door opens, the bigger the opening force of the door is.

The present disclosure provides a door opening speed controller enabling a door to smoothly open even when the door initially opens and enables a door to slowly open at limited speed while the opening of the door finishes in an automatic door opening structure in which the wider the door opens, the bigger the opening force of the door is.

The present disclosure provides a control method for an automatic opening of a door of a home appliance including uninterruptedly supplying signals using electric power (uninterrupted square wave AC power) that is usually input to a home appliance instead of repetitive pulse signals, so as to drive a motor and guarantee that the motor and a driver relevant to the motor is in the correct positions.

The present disclosure provides a control method for an automatic opening of a door of a home appliance, including confirming signals sensed by a monitoring device such as a switch during a predetermined period of time using usual input signals so as to monitor operation of an automatic door opening device without generating error signals and driving a motor.

The present disclosure provides a control method for an automatic opening of a door, including automatically opening a door and simultaneously confirming whether there is an error in an automatic door opening mechanism.

The present disclosure provides a door opening speed controller that may ensure an initial opening speed of a door and suppress an increase in a final opening speed of the door sufficiently in automatic opening of a pull-down door.

The present disclosure includes a main body having a cavity or cooking chamber therein, a door for opening and closing an open front of the cavity or cooking chamber and a rotational axis member serving as a center of rotation for opening and closing movements of the door, wherein the rotational axis member swivably connects the door to the main body around a horizontal rotation axis placed in a front lower part of the main body and extending in the left-right direction, wherein the door opens forward and downward around the rotation axis and is applied to a home appliance (domestic appliance) having a pull-down door the elasticity of which is applied by a spring in the direction where the door is closed.

An automatic door opening structure of the present disclosure may be applied to a structure in which a latch extending toward the main body and swiveling around a horizontal pivot shaft in the door is provided on a surface of the door, which faces the main body, and a latch holder that locks the latch so as to keep the door closed or that unlocks the latch so as to open the door is provided in a part of the main body, which corresponds to a position in which the latch is provided, in the state where the door is closed.

The present disclosure includes a lever that is installed in the latch holder for pushing the latch drawn in a hook accommodating space in the latch holder in the direction where the door opens and that allows the latch to be released from the latch holder.

To this end, the lever pushes the latch in the direction where the door opens while lifting the latch. The force that the door opens by means of the self-weight is greater than force applied by the spring at an angle (a1) where the door slightly opens by the lever. Accordingly, the door opens by means of the self-weight thereof.

In the structure, the lever is not exposed to the outside. Thus, even though an automatic door opening structure is applied to a product, the product may have a neat appearance and may provide emotional quality.

Additionally, the door may open automatically by means of the self-weight thereof without being driven to open completely, thereby implementing an automatic door opening structure readily.

The latch is provided on both sides of the door, and the two latches swivel independently. The lever may be provided only at any one of the latch holders of the two latches. That is, according to the present disclosure, pushing any one of the two latches operating independently allows all the two latches to be released.

If the door opens downward by means of the self-weight without damping, the door or a part where the door and the main body are connected is seriously affected by the slamming of the door.

A door opening speed controller of the present disclosure allows damping force to act in a direction opposite to the direction in which the door opens from an opening angle (a2) greater than the opening angle (a1) to a complete opening angle (a3).

The opening angle (a2) at which damping force starts to act ranges from 30° to 40° such that the door receives enough damping force and opens slowly, but does not open too slowly.

A hinge module may be installed respectively at the lower end of one side of the door and at the lower end of the other side of the door. A damping start angle (a2) of any one of the hinge modules may range from 30° to 40° while a damping start angle (a2') of the other hinge module may range from 60° to 80°.

That is, a damper in the hinge module at the lower end of one side of the door starts to provide damping force when an opening angle of the door is at a damping start angle (a2) while a damper in the hinge module at the lower end of the other side of the door starts to provide damping force when an opening angle of the door is at an additional damping start angle (a2') greater than the damping start angle (a2).

The hinge module may include a housing extending forward and backward and fixed to the main body; a door bar swivably connected to the housing around a rotational axis member and fixed to the door; an inner link housing swivably connected to the door bar through a door bar connecting hinge and guided by the housing so as to move forward and backward; and a damper including a piston and a cylinder and providing damping force according to a relative movement of the piston and the cylinder.

The door bar connecting hinge may be spaced a predetermined distance (r, r') apart from the rotational axis member.

Any one of the piston and the cylinder of the damper moves forward as the inner link housing moves forward, and the other of the piston and the cylinder of the damper moves forward by a predetermined distance (d2, d2') as the inner link housing moves forward and then is interfered by the housing not to move further forward.

According to the present disclosure, a predetermined distance (d2) of the hinge module on one side of the door is shorter than a predetermined distance (d2') of the hinge module on the other side of the door such that damping start angles (a2, a2') of the two hinge modules differ.

Specifically, the damper may further include a slot provided in the other of the piston and the cylinder of the damper and extending forward and backward and a damper support pin installed in the housing and fitted into the slot. The predetermined distances (d2, d2') may be determined based on a length of the slot.

Next, a distance (r) between the door bar connecting hinge and the rotational axis member of the hinge module installed on one side of the door may be longer than a distance (r') between the door bar connecting hinge and the rotational axis member of the hinge module installed on the other side of the door.

If there is a difference in the distances between the door bar connecting hinge and the rotational axis member, a distance moved by the inner link housing at the same opening angle of the door differs. With this structure, the damping start angles (a2, a2') of the two hinge modules may differ.

Of course, the method of making lengths of the slots of the two hinge modules different from each other and the method of making the distance between rotational axis member and the door bar connecting hinge of the two hinge modules different from each other may be applied together.

A stroke of the damper of the hinge module installed on one side of the door and a stroke of the damper of the hinge module installed on the other side of the door may be differentiated at the same opening angle of the door. As an example, a distance between the door bar connecting hinge and the rotational axis member of the hinge module may be adjusted.

If the stroke of each damper differs at the same opening angle of the door, damping force applied to the door by each hinge module may differ even though the same damper is used for two hinge modules. That is, even though the damping coefficient of the damper of the hinge module installed on one side of the door and the damping coefficient of the damper of the hinge module installed on the other side of the door are substantially the same, damping forces (Fd1, Fd2) applied at different moments may differ by differentiating strokes of dampers at the same opening angle of the door. The damping force may be removed at an angle that is 0° to 5° less than a maximum opening angle (a3) of the door such that the door completely opens.

The latch includes a latch bar extending from the door toward the main body and a hook member protruding downward from the end of the latch bar.

Force is applied to the latch in the direction in which the hook member moves downward. A rear inclined surface extending from the lower end of the hook member toward the latch bar is provided on the rear surface of the hook member, which closely faces the door and, in the state where the door is closed, keeps interfering with an inner inclined surface of the latch holder.

The inner inclined surface is inclined upward from the main body toward the door so as to correspond to the rear inclined surface such that the user may manually open the latch holder having an automatic opening structure.

The latch may not be released from the latch holder only by means of a lift of the latch performed by the lever. The latch has to be able to be pushed in the direction in which the door opens while being lifted by the lever. Accordingly, the lever pushes the latch upward in the diagonal direction between the forward direction and the upward direction. Then the latch may pass a structure that holds the latch and escape from the latch holder.

The lever is provided with a pushing member contacting the latch, the pushing member is arranged further forward and downward than the rotation center of the lever and is provided with a push-up inclined surface having a normal line facing the front upper part at the front end thereof, and the push-up inclined surface may include a curved surface.

Accordingly, a low distal end inclined surface having a normal line facing the rear lower part and contacting the push-up inclined surface may be provided at the lower distal end of the latch, and an upper inclined surface that is inclined downward when the upper inclined surface becomes farther away from the door may be provided at the upper distal end of the latch.

A latch passage that is a passage for drawing the latch into and out of the hook accommodating space is provided at the front of the latch holder.

Even though the door is prevented from opening due to interference that happens in the direction where the door opens, and the upper surface of the latch contacts the ceiling of the latch passage and may not move further upward while the latch is moved forward and upward and pushed from the latch holder by the lever, when the lever continues to push the latch forward and lift the same, the latch may finally slide in the direction where the door opens and push the door in the state where the upper surface of the latch contacts the ceiling.

That is, the upper inclined surface provided at the upper distal end of the latch contacts an upper ceiling that is the ceiling of the latch passage in the state where the latch is lifted by the lever and then moves in the direction where the door opens while contacting the ceiling of the passage for a latch so as to allow the force that the lever pushes the latch to be smoothly delivered to the door.

The latch is mounted onto an outer inclined surface provided on the bottom of the latch passage provided at the front of the latch holder by means of elasticity after the latch is released by the lever and pushed in the direction where the door opens. The outer inclined surface is inclined downward from the main body to the door. Thus, the latch does not prevent the opening of the door but, rather, pushes the door further outward by means of the interaction between the force that the latch moves downward and the outer inclined surface while the door opens.

A latch holder for the above-described door opening mechanism includes a holder body constituting an entire frame of the latch holder; a latch passage provided at the front of the holder body and allowing a latch to come in and out; an outer inclined surface provided in the lower part of the latch passage and inclined downward toward the forward direction; an upper ceiling provided in the upper part of the latch passage; a lever supporting portion spaced apart from the latch passage at the rear thereof; a hook accommodating space provided between the latch passage and the lever supporting portion; a lever swivably supported by the lever supporting portion and having a pushing member that is provided at the distal end the lever and accommodated in the lower part of the hook accommodating space; a pusher swiveling the lever supporting portion so as to lift the lever; and a pusher driver driving the pusher.

The pushing member includes an inner insertion member provided at the distal end of the lever and an outer insertion member into which the inner insertion member is inserted and allows the outer insertion member to push the latch in the direction in which the door opens while the outer insertion member contacts the latch and moves. Preferably, the outer insertion member and the lever may be optionally based on different materials in accordance with the properties of each of the components.

Preferably, the outer insertion member is based on a resin material such that the outer insertion member has wear resistance higher than that of the inner insertion member, a coefficient of friction lower than that of the inner insertion member and a surface more lubricated that that of the inner insertion member.

A covering plate that covers the inside of the latch holder such that the inside of the latch holder may not be seen through the latch passage from the outside is provided on the front surface of the lever supporting portion, thereby ensuring a neat appearance of a home appliance.

The lever is supported by a second lever shaft supporter provided on a second lateral surface of the lever supporting portion and swivably installed near the second lateral surface of the lever supporting portion. The lever is provided with a shaft hinge-coupled to the lever supporting portion and a load arm extending from the shaft forward.

The lever may be disposed by detouring the covering plate, and accordingly, the pushing member may extend from the distal end of the load arm in the first lateral direction so as to be accommodated in the lower part of the hook accommodating space.

The covering plate is disposed laterally with respect to the latch passage in an offset manner. Thus, even though the pushing member is disposed by detouring the covering plate, the degree at which the pushing member is eccentrically placed from the load arm of the lever in the lateral direction may be minimized.

The pushing member further includes an upper surface, a lower surface disposed in the lower part of the upper surface and extending further forward than the upper surface, a push-up inclined surface where the front end of the upper surface and the front end of the lower surface are inclinedly connected and a push-end part provided at the lower end of the push-up inclined surface and protruding furthest forward from the pushing member.

As the lever swivels, and the pushing member is lifted, the latch accommodated and held in the hook accommodating space receives force from the lever and is lifted while contacting the push-up inclined surface and moving from the boundary between the upper surface and the push-up inclined surface to the lower end of the push-up inclined surface.

The pushing member is disposed further downward than the rotation center of the lever, and the push-end part is lifted up to a height greater than a height corresponding to the rotation center of the lever as the lever swivels. Accordingly, the pushing member pushes the lever upward and outward.

The lever further includes an effort arm extending from the rotation center of the lever and receiving the force of swiveling the lever in a position spaced apart from the rotation center. The effort arm and the holder body are connected by a return spring applying force to the effort arm in the direction where the pushing member moves downward.

An opening sensing switch for sensing whether the door is closed is installed in the lower part of the hook accommodating space, and a trigger of the opening sensing switch is disposed in the lower part of the pushing member. In the state where the latch is not drawn into the hook accommodating space, the pushing member moved downward by the return spring is not allowed to press the trigger, thereby preventing the pushing member from solely pressing the opening sensing switch. As a result, the home appliance is prevented from operating incorrectly.

The effort arm is pressed by the pusher in a direction opposite to the direction in which the return spring applies force. Accordingly, the effort arm is moved by force that is generated when the pusher presses the effort arm while the force overcomes the restoring force of the return spring, and then the lever swivels such that the pushing member lifts the latch. Additionally, when the pusher returns, the lever is returned to an initial position by the return spring.

The pusher includes a rotating plate rotated by a motor; a pusher cam placed eccentrically from the rotation center of the rotating plate and revolving as the rotating plate rotates so as to press the effort arm and release the same from the pressure. Thus, based on the rotational displacement of the rotating plate, the pusher cam presses the lever or releases the same from the pressure.

The rotating plate further includes a pressing boss eccentrically placed from the rotation center of the rotating plate and placed in a position where the pressing boss avoids the lever even though the pressing boss revolves as the rotating plate rotates, and a return/stop switch having a trigger, pressed when the pressing boss is placed in a predetermined position after the rotating plate rotates and not pressed when the pressing boss escapes from the predetermined position, is provided near the pusher so as to control rotation of the rotating plate and control where the rotating plate stops.

When the trigger of the return/stop switch is pressed, a pusher driver for driving the pusher is allowed to stop, such that the operation of the pusher is exactly controlled by a controller.

According to the present disclosure, a control method for an automatic opening of a door may be applied to a main body having a cooking chamber therein and the above-described automatic opening structure of a home appliance.

According to the present disclosure, a control method for an automatic opening of a door includes controlling the lever, the pusher and the pusher driver by the controller so as to arrange the same in the correct positions when electric power is supplied to the cooking appliance, or the user turns on the home appliance.

The pusher connected with the motor is arranged in a position where the pusher presses the return/stop switch, that is, the return/stop switch is on. When the door opens, the motor moves the pusher and then moves the pusher to a position where the pusher presses the return/stop switch again.

There are times when the pusher is not in the correct position when the home appliance initially operates (the moment when electric power starts to be supplied, the moment when the power button is pressed, and the like). According to the present disclosure, even in this case, the pusher may be arranged in the correct position. If the pusher is not in the position where the return/stop switch is on when the home appliance starts to operate, electric power is supplied to the motor, and then the motor rotates until the pusher presses the return/stop switch. When the motor rotates, and then the pusher presses the return/stop switch, the electric power being supplied to the motor is cut off.

Electric power supplied to the home appliance, i.e., AC power may be used as power supplied to the motor. The power is supplied in an uninterrupted manner not in the form of pulses or in a sporadic manner.

The above-described initial arrangement of the pusher in the correct position is meaningful in the application of a method for uninterruptedly supplying electric power to the motor of the latch holder.

According to the present disclosure, in driving the latch holder, the correct position of the pusher has to be figured out, and the pusher is required to be arranged in the correct position. To this end, in the control method for an automatic opening of a door, the controller continuously monitors a period in which electric power is supplied to the motor, the state where the return/stop switch is on/off and the state where the opening sensing switch is on/off. As a result, an automatic opening of a door may be exactly controlled. Additionally, an arrangement of the pusher in the correct position and an automatic opening of the door may be controlled without a sensor for confirming whether the motor rotates.

According to the latch holder, the pusher moves to a position where the pusher presses the return/stop switch by means of the pressing force applied to the lever by the hook member of the latch while being linked with the latch when the latch is accommodated in the latch holder and locked by the latch holder.

Thus, if the door is correctly closed, the pusher in the latch holder maintains the initial correct position.

At the time of the initial operation of the home appliance, the door may be opened or closed. Even though the door is open, the pusher may be out of the position where the pusher presses the return/stop switch due to a power outage, and the like.

For this reason, the controller according to the present disclosure controls the pusher to arrange the same at the time of the initial operation of the home appliance. According to the present disclosure, a control method for an automatic opening of a door includes step 1 of confirming whether a return/stop switch is on when a home appliance is turned on; step 2 of supplying electric power to a motor when the return/stop switch is off in step 1; step 3 of confirming whether the return/stop switch is on after a predetermined period of time (to) passes following step 2 of supplying electric power to a motor; step 4-1 of returning to step 1 when the controller confirms that the return/stop switch is turned on in step 3.

With the above-described control algorithm, the pusher may be arranged in the correct position at the time of the initial operation of the home appliance.

When the controller confirms that the return/stop switch is kept off in step 3, the return/stop switch or the motor is operating incorrectly. Accordingly, the control method may further include step 4-2 of generating a fourth error signal of a problem with the return/stop switch or the motor and stopping the operation of the home appliance.

When the controller confirms that the return/stop switch is on in step 1, the pusher is already in the correct position. Thus, there is no need to arrange the pusher in the correct position. If the pusher is arranged even though the pusher is arranged in the correct position, a closed door may open.

According to the latch holder of the present disclosure, the pusher is arranged in the correct position by means of the linkage between the lever and the pusher in the state where the door is closed. Thus, the pusher is not required to be arranged when the controller confirms that the return/stop switch is pressed at the time of the initial operation of the home appliance.

When the pusher is arranged in the initial correct position, the controller is in a wait state until the user inputs an instruction to open the door through an input part such as a touch panel, and the like. As described above, the controller continues to monitor the state where the return/stop switch and the opening sensing switch are on/off and whether electric power is supplied to the motor after the home appliance starts to operate.

When the user inputs an instruction to open the door after the controller confirms that the pusher is in the correct position in step 1, and step 5 in which the controller is in a wait state until the user inputs the instruction to open the door starts, an automatic opening of the door starts to be controlled, regardless of whether the pusher is arranged so as to be in the correct position, or whether the pusher is not arranged because the pusher is already in the correct position.

To this end, the control method for an automatic opening of a door includes step 6 of supplying electric power to the motor and confirming whether the return/stop switch is turned off, when the user inputs an instruction to open the door in step 5.

When the controller confirms that the return/stop switch is turned off in step 6, the motor is normally operating. In this case, the control method includes step 7 of confirming whether the opening sensing switch is turned off after a predetermined period of time.

When the controller confirms that the opening sensing switch is turned off in step 7, the lever normally pushes the latch, and the latch is released from the latch holder. In this case, the control method includes step 8 of confirming whether the return/stop switch is turned on.

When the controller confirms that the return/stop switch is turned on in step 8, the return/stop switch is normally operating. In this case, the control method includes step 9-1 of returning to step 1.

Steps 6, 7, 8 and 9-1 may be carried out when the normal operation of the motor, the normal opening of the door (release of the latch) and the normal operation of the return/stop switch are all confirmed through monitoring signals (signals from the return/stop switch and the opening sensing switch, a period in which electric power is supplied to the motor).

When the return/stop switch is turned off in step 6, the motor operated when electric power was supplied to the motor. Accordingly, the motor is normally operating. However, when the return/stop switch is kept on, the motor didn't operate even when electric power was supplied to the motor. In this case, the motor is operating incorrectly.

When the return/stop switch is kept off after a predetermined period of time (long enough for the pusher to operate and to return to the correct position by means of the motor) even though the return/stop switch was turned off in step 6, the motor is normally operating, and the return/stop switch is normally operating because the return/stop switch senses that the motor is normally operating. However, there is a problem with the opening of the door or the operation of the latch such as a problem that the latch may not escape from the latch holder, and the like.

When the return/stop switch is kept off after a predetermined period of time (long enough for the pusher to operate and to return to the correct position by means of the motor) even though the return/stop switch was turned off, and the opening sensing switch was turned off, in step 6, the motor is smoothly operating, and accordingly, the latch is normally released from the latch holder. However, the return/stop switch could not sense that the pusher returned to the initial position. In this case, the return/stop switch is operating incorrectly.

If the opening sensing switch is turned off after a predetermined period of time even though the return/stop switch is kept on in step 6, the motor is normally operating, and accordingly, the latch is normally released from the latch holder. However, the return/stop switch could not sense that the pusher is placed in the position where the pusher does not press the return/stop switch by means of the normal operation of the motor and the pusher. In this case, the return/stop switch is operating incorrectly.

The algorithm and sequence performed by a controller are described as follows.

When the return/stop switch is kept off in step 8, even after electric power is supplied to the motor with an instruction to open the door input by the user, the return/stop switch is turned off, and following a predetermined period of time, the opening sensing switch is turned off, the controller may determine the return/stop switch is operating incorrectly, generate a second error signal and finish operation of the home appliance.

When the opening sensing switch is kept on after a predetermined period of time, even after electric power is supplied to the motor with an instruction to open the door input by the user, and the return/stop switch is turned off, the controller may determine there is a problem with the operation of the latch, generate a first error signal and stop the operation of the home appliance.

When the return/stop switch is kept on, even after electric power is supplied to the motor with an instruction to open the door input by the user, the controller may determine there is a problem with the motor or the return/stop switch and generate an error signal.

The order of determining which of the motor and the return/stop switch is operating incorrectly is described as follows. The determination may be made after it is confirmed that the opening sensing switch having been kept on by the closed door is turned off, following a predetermined period of time (long enough for the motor to rotate so as to operate the pusher and long enough for the lever to push the latch from the latch holder when the motor normally operates).

According to the present disclosure, the control method includes step 12 of confirming whether the opening sensing switch is turned off after a predetermined period of time if the opening sensing switch was on by the closed door when electric power started to be supplied to the motor in step 6.

When the controller confirms that the opening sensing switch is turned off in step 12, the motor is normally operating while the return/stop switch is operating incorrectly. Accordingly, the control method may include step 13-1 of generating a second error signal of a problem with the return/stop switch.

Conversely, when the controller confirms that the opening sensing switch is kept on in step 12, the motor is operating incorrectly. Accordingly, the control method may include step 13-2 of generating a third error signal of a problem with the motor.

As described above, when determining which of the motor and the return/stop switch is operating incorrectly, it is confirmed that a closed door normally opens. Thus, when the opening sensing switch is already off (the door is open) from the moment when electric power is supplied to the motor, it is difficult to confirm which of the motor and the return/stop switch is operating incorrectly. In this case, the controller may generate a fourth error signal of a problem with any one of the motor and the return/stop switch.

The error signals may be shown on a display, and the like, or an alarm may be used as the error signals.

According to the present disclosure, a structure for an automatic opening of a door provided with a pair of latches moving independently may be implemented only with the installation and operation of a lever applied to any one latch holder. Accordingly, a door may automatically open with no need to link a pair of latches and apply an opening structure to all the two latches, thereby making it possible to simply design a door and ensure greater space for a cavity of a home appliance.

Additionally, according to the present disclosure, a lever is used to increase the opening force of a door, and a door initially opens to a position where the door automatically opens by means of the self-weight, thereby making it possible to automatically open a door only with a low output power driver.

Additionally, according to the present disclosure, since a driving system itself is light, a lever and a pusher may be rearranged in the correct positions by means of the pressing force applied to the lever by a latch even though the lever and the pusher slightly escape from the correct positions when the latch is accommodated in a latch holder by closing a door, thereby making it possible to smoothly close a door.

Additionally, an automatic opening structure of the present disclosure is installed in a position not affected by heat of a cooking chamber, and components thereof are not exposed to the outside, thereby making it possible to prevent a home appliance from operating incorrectly and to ensure a neat appearance of a home appliance.

A door opening speed controller of the present disclosure enables a door to smoothly open even when the door initially opens and enables a door to slowly open while the opening of the door finishes in an automatic door opening structure in which the wider the door opens, the bigger the opening force of a door is, thereby making it possible to control an automatic opening of a door and to smoothly open the door.

According to a control method for an automatic opening of a door of a home appliance of the present disclosure, usual electric power is supplied to a motor with no need to generate another type of power in addition to uninterrupted AC power usually supplied to a home appliance, and errors or abnormalities of each component of an automatic door opening device may be monitored only through signals from a return/stop switch for determining where a motor stops and an opening sensing switch for confirming whether a door opens. That is, according to the control method of the present disclosure, an automatic opening may be exactly controlled without a sensor for confirming whether a motor operates or a sensor for confirming whether a latch stays in the correct position in a latch holder.

Additionally, according to the present disclosure, power supplied to a motor and signals from a return/stop switch and an opening sensing switch may be continuously monitored while a door automatically opens with no need to confirm errors in the automatic opening of a door, thereby making it possible to confirm whether the door operates correctly in real time.

Further, according to the control method of the present disclosure, an automatic opening of a door may be exactly controlled simply with a motor and a pusher (cam), a lever and a return/stop switch in addition to a conventional latch holder in the absence of a sensor or a controlling means.

BRIEF DESCRIPTION OF THE DRAWINGS

FIG. 3 is a perspective view illustrating a holder body of the latch holder in

FIG. 2.

FIG. 2O is a flow chart illustrating the steps of generating error signals in FIG. 19.

DETAILED DESCRIPTION

Figure 1:
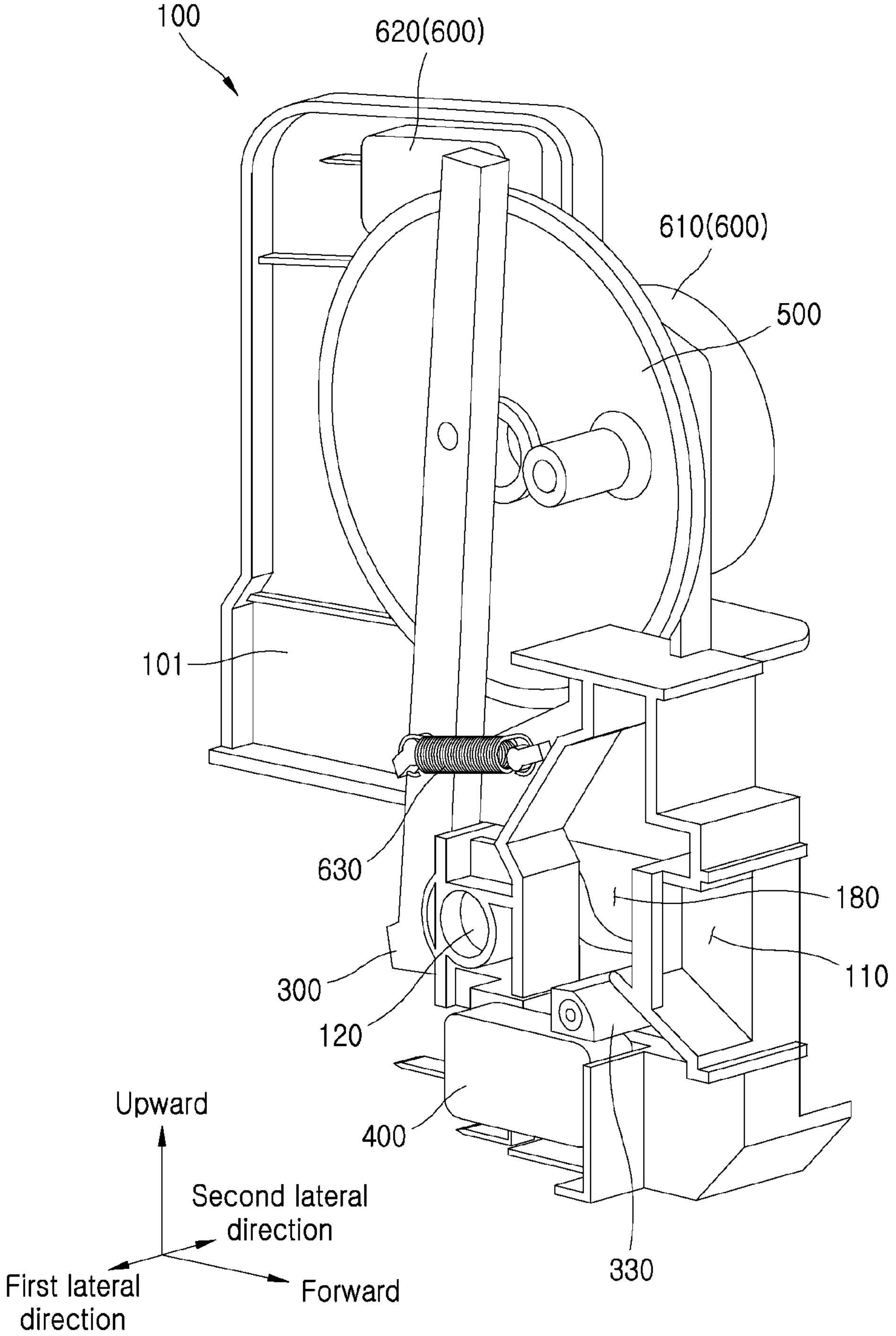
FIG. 1 is a perspective view illustrating a latch holder to which an automatic opening structure of a cooking appliance according to an embodiment of the invention is applied.
Figure 2:
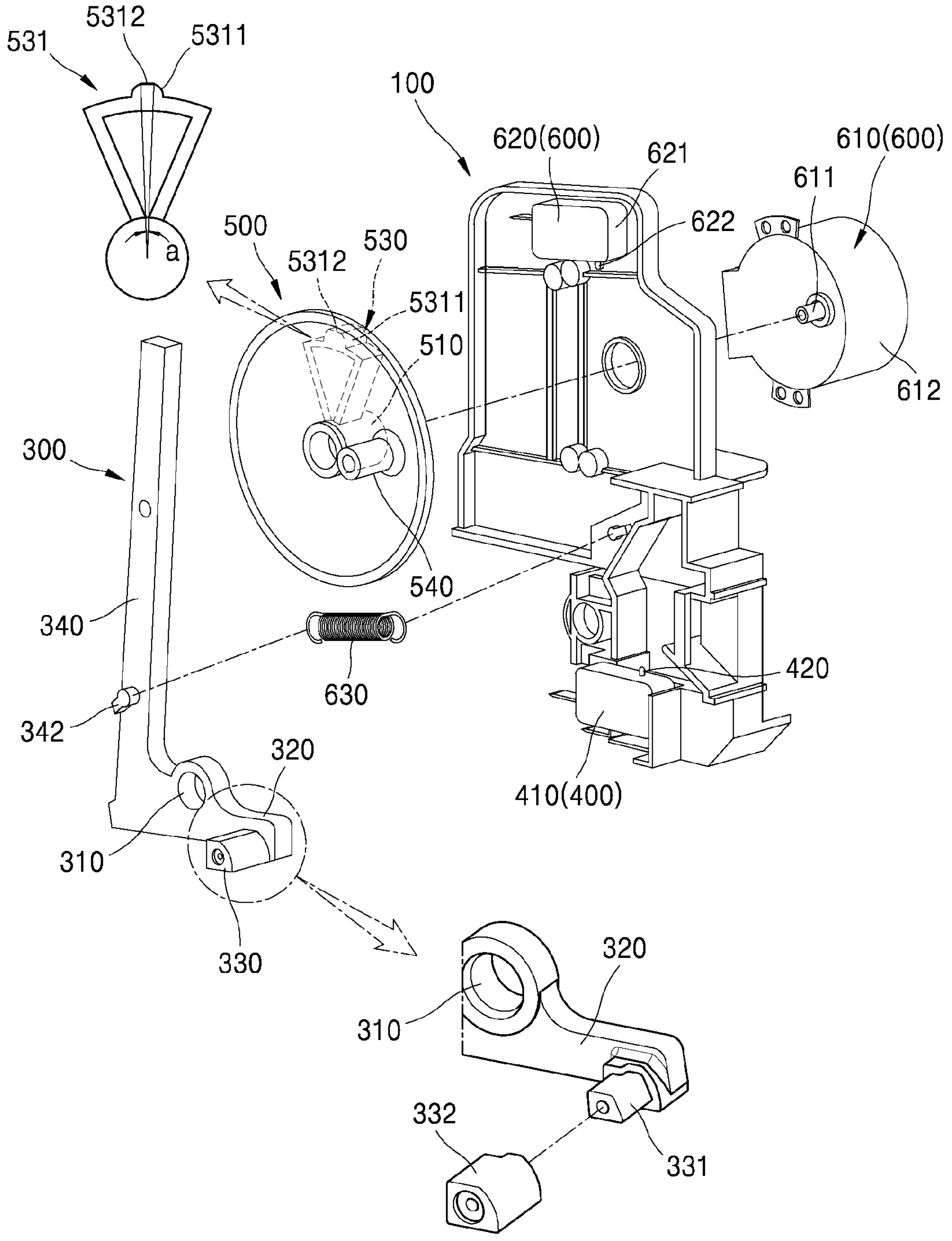
FIG. 2 is an exploded perspective view illustrating the latch holder in FIG. 1.

Implementations of the present disclosure will now be described with reference to the attached drawings.

The present disclosure may be implemented in many different forms and accordingly, is not limited to the implementations set forth hereunder. Features illustrated in the drawings may be combined or omitted as needed in order to achieve a desired purpose. Further, the implementations are provided to make the present disclosure thorough and complete to one having ordinary skill in the art to which the present disclosure pertains.

Figure 12:
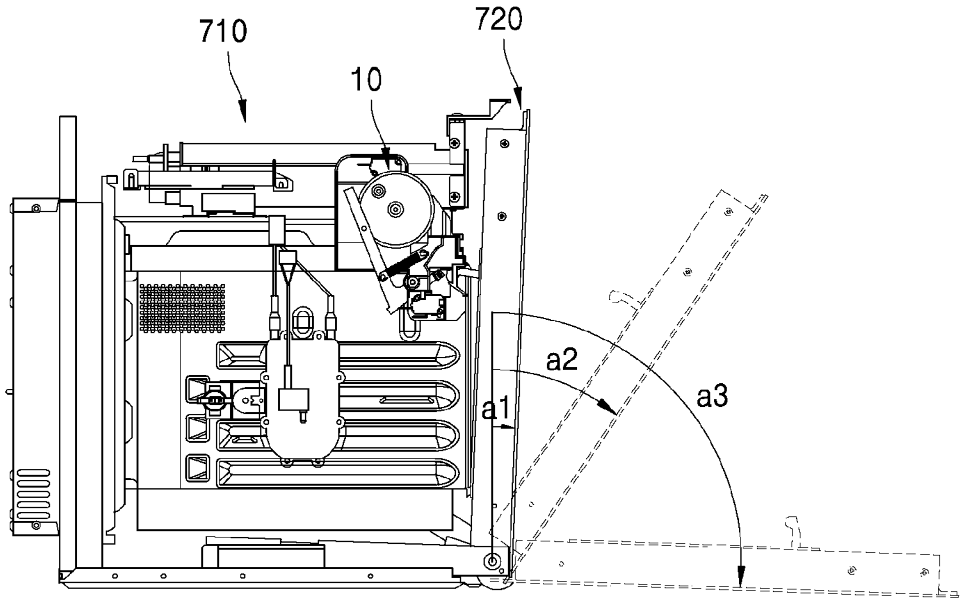
FIG. 12 is a view illustrating a process in which the door opens by means of self-weight after the latch is released from the latch holder as in FIG. 11.

Referring now to FIG. 12, a cooking appliance is illustrated. However, the implementations of the present disclosure is not limited to a cooking appliance. The implementations of the present disclosure can be applied to other appliances with pull-down doors. An appliance can be that used in a home or commercially.

The cooking appliance includes a main body 710 that has an approximately rectangular cuboid shape, that is hollow inside and an open front. A door 720 is installed at the open front of the main body 710.

The main body 710 includes an outer housing defining an outer appearance of the cooking appliance, and an inner housing forming a cavity that is opened in the front. In this embodiment, the cavity may be a cooking chamber. The main body 710 further includes various components required for operating the cooking appliance.

The door 720 is a pull-downtype opening and closing structure which rotates about a horizontal hinge shaft 814 (see FIGS. 13 and 14) that is provided at a lower end of the door. The door 720 swivels forward and downward with respect to the main body so as to be opened and swivels rearward and upward with respect to the main body so as to be closed.

A surface area of a door may simply be a surface area for opening and closing the front of the cooking chamber.

Alternatively, as illustrated in FIG. 12, the door 720 may have a surface area for entirely closing the front of an upper space above the cooking chamber as well as the cooking chamber. A display, a touch panel, and the like may be installed on the front surface of the door 720 corresponding to the upper space above the cooking chamber. The display and the touch panel connect with a controller 90 (see FIG. 22). The controller 90 may be installed in the upper space above the cooking chamber or an inner space of the door 720 corresponding to the upper space above the cooking chamber.

A latch holder 10 for keeping the door 720 closed and allowing the door to automatically open is provided at an upper part of the main body 710 in the lateral direction of the main body. A latch 200 that is locked by the latch holder 10 so as to keep the door closed and that is released from the latch holder 10 so as to open the door is provided at the door 720.

Figure 3:
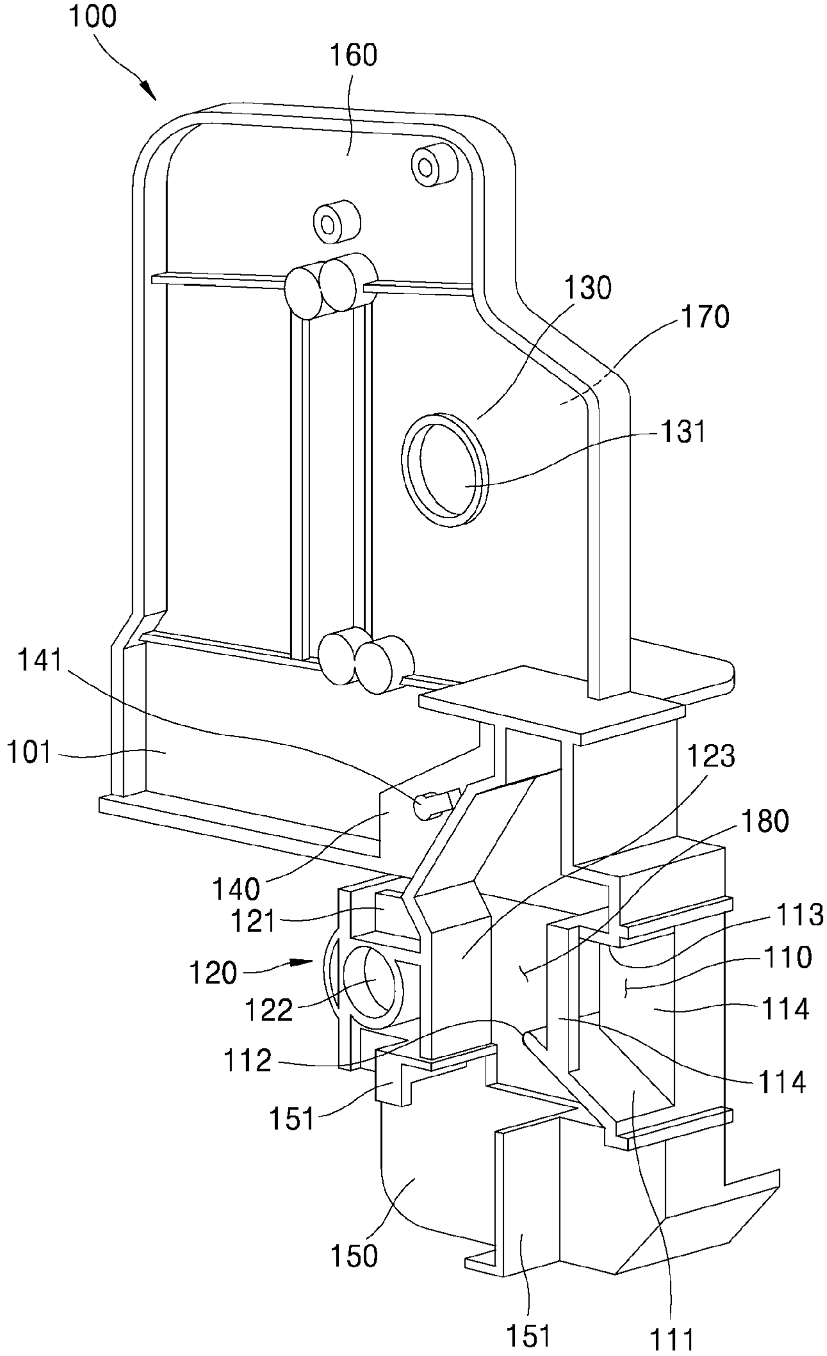
Figure 4:
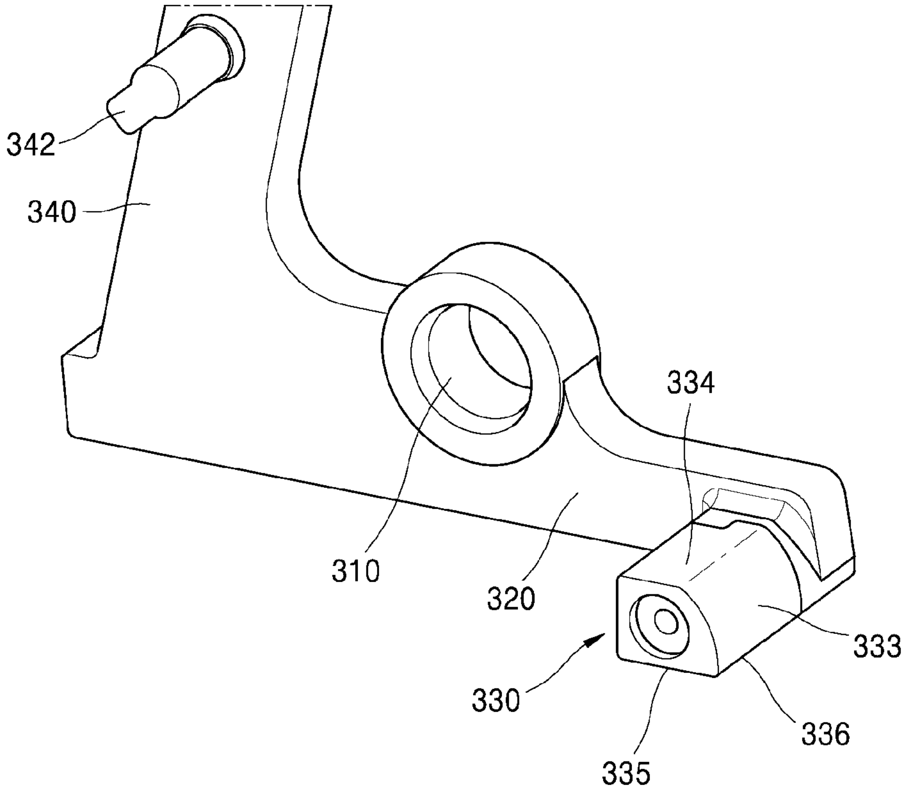
FIG. 4 is an enlarged view illustrating a shaft, a load arm and a pushing member of a lever of the latch holder in FIG. 2.

The latch 200 protrudes from a back surface of the door 720 facing the main body 710 from upper portions of both ends of the door 720. The latch holder 10 at the main body 710 is arranged at front upper parts of both ends of the main body, corresponding to the positions where the latch is installed at the upper portions of both ends of the door 720. The latch holder 10 is provided with a latch passage 110 (see FIG. 3) opened forward to allow the latch to come in and out of the latch holder 10.

A latch holder 10 with a mechanism for automatically releasing a locked latch may be provided for any one of two latches 200 at the door 720, and another latch holder without a mechanism for automatically releasing a locked latch may be provided for the other latch 200. The two latches 200 may be installed at the door 720 such that they may independently move upward and downward. The two latches 720 may be elastically supported at the door, for example, using springs, with hook members at the distal ends of the two latches facing downward. The elasticity applied to the two latches may be the same or they may be different.

Figure 13:
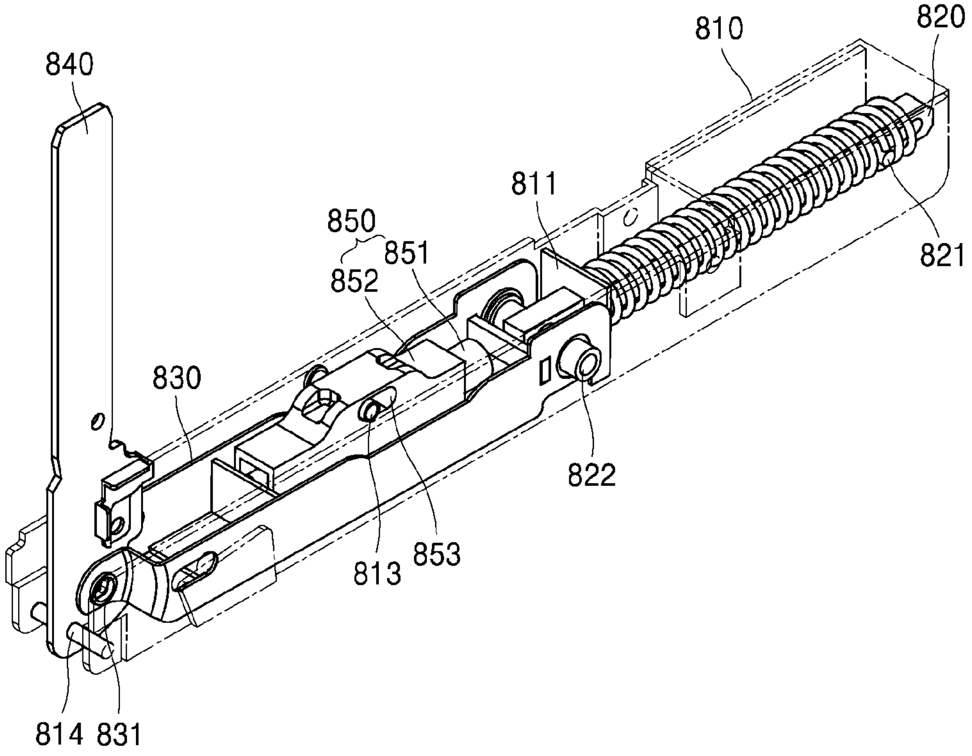
FIG. 13 is a perspective view illustrating a structure of a hinge according to an embodiment of the invention used to move the door downward by means of self-weight and allow the door to open automatically as in FIG. 12.
Figure 14:
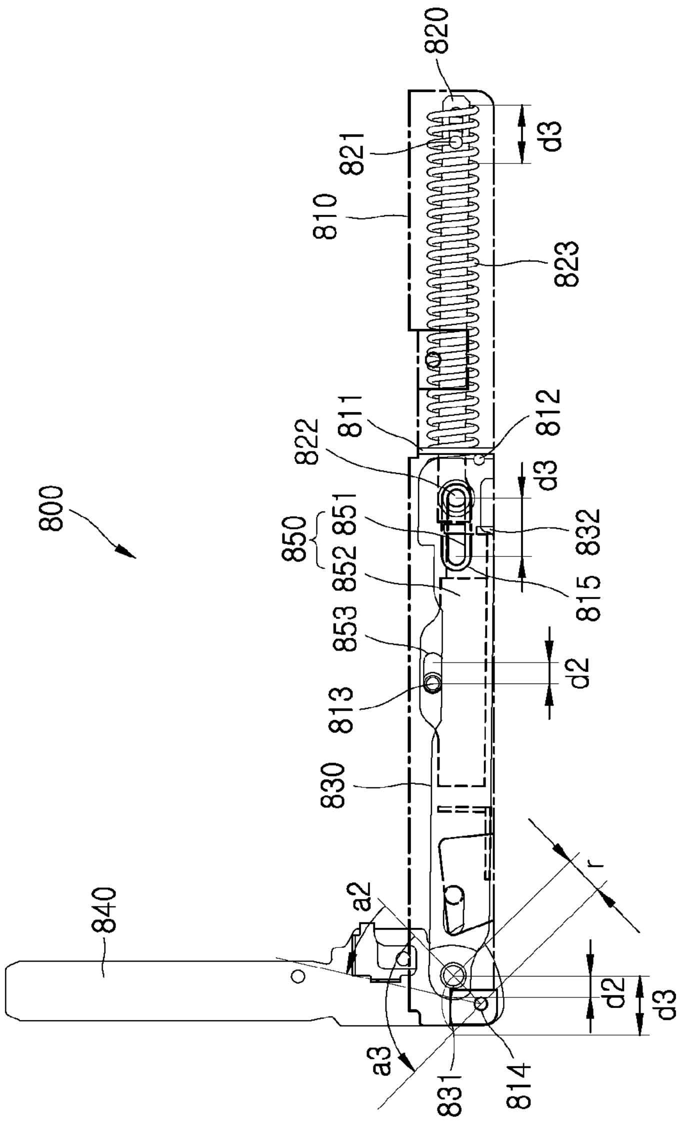
FIG. 14 is a side view illustrating the structure of the door hinge in FIG. 13.

Referring now to FIGS. 13 and 14, a hinge module 800 in which a spring 823 and a damper 850 are installed is connected to a front lower part of the main body and a lower part of the door. The spring 823 applies force to the door in the direction in which the door 720 swivels backward and upward, i.e., in the direction in which the door is closed. Thus, the spring 823 applies force that opposes the force generated by the door that is automatically released and swivels forward and downward, i.e., in the direction in which the door is opened.

The damper 850 reduces a rotational force of the door when the door opens, thereby causing the door to open more slowly when the damping force is applied. The damper 850 may provide damping force only when the door opens or may provide damping force at all points where the door is opening and closing. In this embodiment, the damper may provide damping force in a range among all of the swivel angles in which the door swivels so as to be opened and closed The damper 850 may damp the opening force of the door in a range of predetermined opening angles in a section where the door opens and may not damp the opening force of the door outside the range of predetermined opening angles. For example, referring to FIG. 12, a structure in which a damper operates in a range of opening angles between a2 and a3 is illustrated. A damping start angle (a2), at which damping starts as the door opens, may be 35±5° which continues until the door is fully opened at end angle (a3).

Referring now to FIGS. 1 to 7, a latch holder with an automatic door opening device according to an embodiment of the invention will be described.

The latch holder includes a holder body 100 for supporting an entire structure, a latch passage 110 provided at a front of the holder body 100, and a lever 300, an opening sensing switch 400, a pusher 500, and a pusher driver 600 installed at the holder body 100.

The latch passage 110 provides for a latch 200 of the door 720 to come in and out of the holder body 100. A hook accommodating space 180 for accommodating a hook of the latch is provided in the holder body 100 at the rear of the latch passage 110. An opening sensing switch 400 is installed in a lower part of the holder body 100 below the hook accommodating space 180 for sensing whether the hook of the latch has entered the hook accommodating space 180 and held by the same.

A lever supporting portion 120 in which the lever 300 is swivably installed is provided at the rear of the hook accommodating space 180. The lever 300 is provided with a load arm 320 extending forward from the lever supporting portion 120, a pushing member 330 laterally extending from a distal end of the load arm 320 to occupy a lower space in the hook accommodating space 180 and an effort arm 340 extending backward from the lever supporting portion 120 and then extending upward.

The opening sensing switch 400 installed below the hook accommodating space 180 is provided with a trigger 420 disposed to be able to abut a lower surface 335 of the pushing member 330. The trigger 420 is pressed by contacting the pushing member 330. However, the force of pressing the trigger 420 is insufficient by the pushing member 330 alone, and the force is supplied by the latch 200 when accommodated in the hook accommodating space 180.

A pusher 500 for pushing the effort arm 340 of the lever 300 backward and a pusher driver 600 for supplying force for driving the pusher 500 are installed at an upper part of the holder body 100 above the lever supporting portion 120. A motor 610 of the pusher driver 600 is fixed onto a second lateral surface of the holder body 100, and the pusher 500 is disposed on a first lateral surface of the holder body 100 and rotatable by the motor 610. The rotational displacement of the motor 610 is controlled by a return/stop switch 620 and the controller 90. The rotational displacement is controlled by pressing a trigger 622 of the return/stop switch 620 by a pressing boss 530 installed in the pusher 500 based on an angular displacement of the pusher 500.

The effort arm 340 of the lever 300 is connected to the holder body 100 by a return spring 630 and receives force applied forward by the return spring 630 to return to its initial position. Below, each element of the latch holder according to the present disclosure will be described.

A holder body 100 supporting an entire structure of the latch holder includes a flat surface extending in the up-down direction and in the front-rear direction, i.e., a base plate 101 including a flat surface having a normal line in the first lateral direction and in the second lateral direction.

A latch passage 110 opened forward is provided in the front lower part of the holder body 100. The latch passage 110 is a passage for allowing a latch 200 to come into the holder body 100 from the front part of the holder body 100 or for allowing the latch to escape the holder body 100 from the front part of the holder body 100.

An outer inclined surface 111 defines a lower inclined boundary of the latch passage 110, an upper ceiling 113 defines an upper boundary of the latch passage 110, and side walls 114 define side boundaries of the latch passage 110 in both lateral directions thereof.

The outer inclined surface 111 inclined upward from the front thereof to the rear thereof is provided in the lower part of the latch passage 110. When the latch 200 comes into the holder body 100, a low distal end inclined surface 232 of a hook member 230 (see FIG. 8) of the latch 200 rides on the outer inclined surface 111.

An inner inclined surface 112 is provided at the rear end of the outer inclined surface 111. The inner inclined surface 112 is inclined upward from the rear thereof to the front thereof. The inner inclined surface 112 and the upper end of the outer inclined surface 111 are connected with each other in the shape of a smoothly curved surface.

The inner inclined surface 112 contacts a rear inclined surface 231 of the hook member 230 of the latch 200 drawn in the holder body 100 so as to prevent the latch 200 from escaping out of the holder body 100. Additionally, the inner inclined surface 112 supplies an inclined surface so as to allow the rear inclined surface 231 of the latch 200 to naturally slide upward when the user pulls the door forward to open the door. The rear inclined surface 231 may be a flat surface or a curved surface with a slightly convex shape. That is, the rear inclined surface 231 has a surface such that the user may manually open the door.

The upper ceiling 113 includes a horizontal ceiling provided in the upper part of the latch passage 110. When the lever 300 pushes the latch 200 so as to automatically open the door, the upper ceiling 113 contacts the upper surface of the latch 200, more specifically, an upper inclined surface 221 of the latch 200, and guides the upper inclined surface 221 so as to allow the upper inclined surface 221 to slide forward and out of the holder body 100.

Both sides of the upper ceiling 113 and the outer inclined surface 111 are vertically connected to each other by the side wall 114. A gap between two side walls 114 is greater than a width of the latch 200. Thus, the two side walls 114 do not interfere with the latch 200.

A covering plate 123 is provided at the rear of the latch passage 110 to cover the inside of the latch passage when seen from the front to the rear. The covering plate 123 includes a flat plate shape having a normal line in the front-rear direction. The covering plate 123 is spaced backward from the latch passage 110 so as to form one boundary of the hook accommodating space 180. The hook member 230 of the latch 200 is accommodated in the hook accommodating space 180.

The covering plate 123 is perpendicularly connected to the base plate 101 so as to reinforce the entire stiffness of the holder body 100. A lever supporting portion 120 for rotatably supporting the lever 300 is installed at the rear of the covering plate. The lever 300 is an element for releasing a latch 200 locked by the holder body 100.

The lever supporting portion 120 requires a certain level of stiffness so as to support the lever. The stiffness may be satisfied by the covering plate 123.

The lever 300 installed at the lever supporting portion 120 is disposed in a position where the lever 300 swivels without interfering with the covering plate 123 and the lever supporting portion 120. The lever supporting portion 120 is provided with an extending member 121 extending from the base plate 101 and connected to the covering plate 123, and a lever shaft supporter 122 is provided in the extending member 121 to rotatably support the lever 300. The lever 300 is axially coupled to the lever shaft supporter 122 so as to swivel. The level 300 may contact a second lateral surface of the extending member 121 so as to be guided when swiveling.

A pushing member 330 extends from the distal end of the lever 300 in the first lateral direction. The pushing member 330 is disposed in the hook accommodating space 180 provided between the covering plate 123 and the latch passage 110.

The covering plate 123 may be disposed in the first lateral direction of the latch passage 110 in an offset manner. This is to minimize lateral eccentricity between the pushing member 330 and the effort arm 340 of the lever 300, to which force is applied.

An opening sensing switch fixing portion 150 for fixing an opening sensing switch 400 sensing whether the door is closed is provided below the latch passage 110 and the lever supporting portion 120. The opening sensing switch fixing portion 150 includes a flat surface having a normal line in the lateral direction and connects the lower part of the latch passage 110 and the lower part of the lever supporting portion 120.

The opening sensing switch fixing portion 150 includes a fixing wall 151 for fixing a switch body 410 of the opening sensing switch 400 to the opening sensing switch fixing portion 150, and at least a part of the fixing wall 151 may be connected to the lever supporting portion 120.

A trigger 420 of the opening sensing switch 400 protrudes upward toward the hook accommodating space 180 in the state where the switch body 410 is installed in the opening sensing switch fixing portion 150. The lever 300 has a path that presses the trigger 420.

The holder body 100 further includes a pusher 500 for pushing the lever 300 and a structure for supporting the pusher driver 600.

The pusher 500 for pushing the lever 300 is installed in the holder body 100 so as to swivel the lever 300 in the direction in which the latch 200 is released from the holder body 100. To this end, a pusher supporting portion 130 for supporting the pusher 500 is provided at the base plate 101. The pusher supporting portion 130 includes a hole 131 into which a rotating shaft 510 of the pusher 500 is inserted and a first lateral surface facing a rotating plate 520 of the pusher 500. The first lateral surface also faces a pressing boss 530 provided on a second lateral surface of the rotating plate 520.

A pusher driver fixing portion 170 for fixing the pusher driver 600 driving the pusher 500 is included on a second lateral surface opposite to the first lateral surface of the base plate 101, on which the pusher 500 is installed. The pusher driver 600 may be a rotating motor 610, and a housing of the motor 610 may be fixed onto the second lateral surface of the base plate 101.

A return/stop switch fixing portion 160 for fixing the return/stop switch 620 is provided at the base plate 101 of the holder body 100. The return/stop switch 620 is provided with a trigger 622 pressed by the pressing boss 530 of the pusher 500. The trigger 622 is pressed by the pressing boss 530 in a position to which the pusher 500 is required to return after pushing the lever 300, so as to stop the rotation of the motor 610. Accordingly, the return/stop switch 620 is installed in a position where the trigger 622 is pressed by the pressing boss 530 in a position to which the pusher 500 returns. The return/stop switch fixing portion 160 may be provided in the upper part of the holder body 100 above the pusher supporting portion 130.

A return spring supporting portion 140 is provided at the holder body 100 so as to supply the force of returning the lever 300 to an initial position after the lever 300 pushes the latch 200. The return spring supporting portion 140 is closer to the lever supporting portion 120 than the pusher supporting portion 130. The return spring supporting portion 140 may include a hook hanger 141 for hooking a ring provided at one end of the return spring 630.

A shaft hole 310 of the lever 300 joins with a lever shaft supporter 122 of the holder body 100 to be swivably fixed to the lever supporting portion 120. The lever shaft supporter 122 includes a shaft shape extending in the second lateral direction, and the shaft hole 310 may have a hole shape so as to accommodate the shaft shape of the lever shaft supporter 122. Conversely, the lever shaft supporter 122 may have a hole shape, and the shaft hole 310 may instead have a shaft shape instead of a hole.

The lever 300 includes a load arm 320 extending forward from the shaft hole 310. A pushing member 330 extending in the first lateral direction is provided at the distal end of the load arm 320. The pushing member 330 is disposed in a hook accommodating space 180 of the holder body 100 in the state where the lever 300 is installed in the holder body 100.

According to the embodiment, the lever 300 is made from a material having stiffness because the lever delivers the force of pushing the latch 200, and the pushing member 330 is made from a material having high wear resistance and a low coefficient of friction because the pushing member 330 slidably contacts the latch 200. The lever 300 may be made from a metallic material such as an aluminum alloy, and the like.

The pushing member 330 may be made from a material the same as that of the lever 300 or includes an inner insertion member 331 integrally formed with the lever 300 and an outer insertion member 332 into which the inner insertion member 331 is inserted. The inner insertion member 331 ensures stiffness of the pushing member 330, and the outer insertion member 332 may be made from a material having high wear resistance and a low coefficient of friction so as to slidably contact the latch 200. The pushing member 330 slidably contacts the latch 200 and moves upward, and a push-end part 336 definitively pushes the distal ends 232, 233 of the latch 200. Thus, the surface of the outer insertion member 332 may be made from a material with a high degree of surface hardness, high wear resistance, a low coefficient of friction and lubricability, thereby ensuring a reliable operation.

The inner insertion member 331 may be integrally formed with the lever 300 using a metallic material such as an aluminum alloy, and the like. Unlike the inner insertion member, the outer insertion member 332 may be made from a resin material. Even though elastic deformation and restoration of the outer insertion member is repeated by the force applied to the outer insertion member 332 by the latch 200, the surface of the outer insertion member is resilient because resin materials have a high degree of surface hardness, are elastically deformed and restored, and are not easily broken and crumbled, unlike metallic materials. As a result, even when movably contacting the latch 200, the outer insertion member 332 pushes the latch 200 through the elastic deformation and restoration thereof but does not break.

The pushing member 330 may be a single member made from a metallic material. When the pushing member 330 directly contacts the latch 200 for an extended period of time, any one of the pushing member 330 and the latch 200 may be damaged, caused by continuous contact between metallic materials, on the surface thereof. Additionally, since metallic materials do not have as much elasticity, unlike resin materials, the latch 200 may not be smoothly released.

The pushing member 330 seen from the side may have the cross section of an approximate trapezoid shape. The lower surface 335 of the pushing member 330 is a pressing surface that presses the trigger 420 of the opening sensing switch 400 positioned below the pushing member 330. The upper surface 334 of the pushing member 330 is a surface on which the hook member 230 of the latch 200 accommodated in the hook accommodating space 180 is rested. The latch 200 presses the pushing member 330 downward from the upper surface of the pushing member 330, and the pushing member 330 presses the trigger 420 by means of the pressing force of the latch.

In the state where only the pushing member 330 is placed on the trigger 420 without the latch 200 on the pushing member 330, the pushing member 330 cannot press the trigger 420 but just seats on the trigger 420 because the force exerted by the load of the pushing member 330 is insufficient to press down and activate the trigger 420 of the switch body 410.

A push-up inclined surface 333 is provided on the front surface of the pushing member 330. The lower end of the push-up inclined surface 333 protrudes further forward than the upper end thereof and has a shape that inclines further backward starting from the lower end of the push-up inclined surface to the upper end thereof. The push-up inclined surface 333 may have a curved profile with a slightly convex shape and is a surface that slidably contacts a low distal end inclined surface 232 of the latch 200 and delivers force of the lever 300 to the latch 200. A push-end part 336 for pushing the distal end of the latch 200 to the very end is provided by the lower end of the push-up inclined surface 333.

The lever 300 further includes an effort arm 340 extending backward and then upward from the shaft hole 310. A distance between the shaft hole 310 and an effort of the effort arm 340 is greater than a distance between the shaft hole 310 and the pushing member 330, thereby providing leverage so as to increase the force of lifting and pushing the latch 200 applied by the pushing member 330. Thus, with this structure, a low-powered and lighter pusher driver 600 may be used.

To make the latch holder more compact, the effort arm 340 may have an approximate "L" shape, and the effort may be provided near the upper end of the effort arm 340. The effort arm 340 receives force from the pusher 500, and that force is delivered to the pushing member 330.

The effort arm 340 includes a spring fixing portion 342 connected to one end of a return spring 630 that returns the lever 300 to an initial position when the pusher 500 no longer applies force to the effort arm 340. The spring fixing portion 342 is disposed closer to the shaft hole 310 than the effort of the effort arm 340. A strong returning force is required when the lever 300 pushes the latch 200 while a strong returning force is not required when the lever 300 returns to an initial position after pushing the latch 200. Accordingly, the spring fixing portion 342 may be disposed closer to the shaft hole 310 than the effort of the effort arm 340. The spring fixing portion 342 may have a hook hanger shape for hooking a ring provided at the other end of the return spring 630.

According to the embodiment, the return spring 630 supplies force small enough to allow the lever 300 to return to an initial position, but does not further apply force after that. That is, the return spring 630 is prevented from continuously applying force to the lever 300 having returned to an initial position such that the return spring 630 provides additional force to the pushing member 330 of the lever 300 that presses the trigger 420 of the opening sensing switch 400 without the presence of the latch 200.

The lever 300 includes a first surface facing the first lateral direction and a second surface facing the second lateral direction. The first surface is contacted and supported by a second surface of the lever supporting portion 120, which faces the second lateral direction.

The pusher 500 is an element for pushing an effort of the lever 300 and is installed in the holder body 100. The pusher 500 is disposed near the effort arm 340 of the lever 300. The pusher 500 includes a rotating plate 520 having a normal line in a first lateral direction and a plane shape, a rotating shaft 510 provided at the center of a second lateral surface (surface facing a second lateral direction) of the rotating plate, a pressing boss 530 eccentrically placed from the center of the second lateral surface of the rotating plate, and a pusher cam 540 eccentrically placed from the center of a first lateral surface (surface facing a first lateral direction) of the rotating plate 520.

The rotating plate 520 has a flat discus shape, and the effort arm 340 of the lever 300 is disposed so as to face the first lateral surface of the rotating plate 520.

The rotating shaft 510 extends toward the second lateral direction. That is, the rotating shaft 510 is a rotation center of the rotating plate 520 that is disposed so as to extend laterally. The distal end (end part far from the rotating plate) of the rotating shaft 510 is inserted into and rotatably supported by a hole 131 of the holder body. The rotating shaft 510 is fixed to a rotating driving shaft 611 of the motor 610 provided opposite the rotating plate 520 by means of a shaft coupling, and the holder body 100 is placed between the rotating plate 520 and the motor 610.

The pressing boss 530 is connected to the base end (end part close to the rotating plate) of the rotating shaft 510 and provided at the second lateral surface of the rotating plate 520. The pressing boss 530 is provided at any one part of the rotating plate 520 in the circumferential direction thereof. In this embodiment, the pressing boss 530 is a wedge shape. However, other shapes may be used. The outer end of the pressing boss 530 in the radial direction thereof may be used to press the trigger 662 of the return/stop switch 620. In this embodiment, the pressing boss 530 is provided with a pressing portion in a position where the pressing boss may press the trigger 622 of the return/stop switch 620. While various shapes may be used, in this embodiment, the pressing boss has a convexly curved portion 531 at the distal end thereof for pressing the trigger 622 while rotating around the rotating shaft 510. The curved portion 531 of the pressing boss 530 has a convex shape when seen at least laterally. The trigger 622 is contacted and pressed along a convex shape of the curved portion 531.

The curved portion 531 includes curve profiles 5311 provided on both sides thereof and a push maintaining profile 5312 connecting the curve profiles 5311. The push maintaining profile 5312 maintains the state where the trigger 622 is pressed even when the rotating plate 520 rotates for a predetermined angle (a). Thus, even though electric power being supplied to the motor 610 is cut off as soon as the trigger 622 is pressed, the rotating plate 520 rotates further by the inertia of the motor 610 and the rotating plate 520, and the pressing boss 530 may no longer press the trigger 622, thereby releasing the trigger 622. The push maintaining profile 5312 maintains the state where the pressing boss presses the trigger even when the rotating plate rotates further by the inertia of the motor and the rotating plate.

According to the embodiment, one rotation of the rotating plate 520 is associated with the opening of the lever. Accordingly, the one rotation of the rotating plate may be exactly controlled with the structure of the push maintaining profile 5312.

In comparison, the cam in U.S. Patent Publication No. 2011-0095019 is heavy because the cam has a structure in which the cam is directly connected to a driving portion, and one-fifth rotation of the cam is associated with the upward movement of a lever. Thus, the rotating cam might not stop in the correct position but might rotate further. When the cam does not stop in the correct position, the door is closed. In this case, the cam is not likely to return to the correct position even though the latch presses the cam.

The pusher cam 540 has a cylinder shape protruding and extending from the first lateral surface of the rotating plate 520 in the first lateral direction. As the pusher 500 rotates, the outer circumferential surface of the cylinder of the pusher cam 540 pushes the effort arm 340 of the lever 300 backward, which is disposed close to the first lateral surface of the rotating plate 520.

The pusher driver 600 includes the motor 610 fixed onto the second lateral surface of the holder body 100 and coupled to the rotating shaft 510 of the pusher 500 penetrating the holder body 100. The return/stop switch 620 is fixed onto the first lateral surface of the holder body 100 and controls the stop of the motor 610.

The housing 612 of the motor 610 is fixed to the holder body 100, and the rotating driving shaft 611 of the motor 610 is fixed to the rotating shaft 510 of the pusher 500.

When the user inputs an instruction to automatically open the door of the cooking appliance through an input part, electric power is supplied to the motor 610, and the rotating driving shaft 611 rotates. Then the motor 610 rotates until the pressing boss 530 of the pusher 500 presses the trigger 622 of the return/stop switch 620. That is, when the trigger 622 of the return/stop switch 620 is pressed by the pressing boss 530, the electric power being supplied to the motor 610 is cut off. Accordingly, the rotating driving shaft 611 and the pusher 500 start to rotate from a position where the pressing boss 530 presses the trigger 622 and continue to rotate until the pressing boss 530 presses the trigger 622 again. Thus, when one pressing boss 530 is provided in the rotating plate 520 in the circumferential direction thereof as in the embodiment, the pusher 500 makes one rotation and then stops all the time. If two pressing bosses 530 are provided at equal intervals in the circumferential direction thereof, the pusher 500 makes half a rotation and then stops all the time.

The switch body 621 of the return/stop switch 620 is installed outside the pusher 500 so as not to interfere with the pusher. However, the switch body 621 is installed in a position where the trigger 622 may interfere with the pressing boss 530.

Controlling a position where the pusher 500 stops rotating with the return/stop switch 620 is advantageous in many aspects. Rotating (one rotation in the embodiment) at a predetermined angle all the time may be physically realized with a simple structure. Additionally, as long as the controller 90 allows electric power to be supplied to the motor 610 such that the pusher 500 rotates when electric power is supplied again, even though the pusher 500 stops rotating due to a power outage, and the like, the pusher 500 returns and exactly stops and is disposed back to its initial position and pressing the trigger 622 of the return/stop switch 620.

The opening sensing switch 400 includes a switch body 410 fixed onto the fixing wall 151 of the opening sensing switch fixing portion 150 provided below the hook accommodating space 180, and the trigger 420 protruding upward from the switch body 410. The trigger 420 has elasticity such that the trigger protrudes upward when external force is not applied to the trigger. Accordingly, when external force pressing the trigger 420 is removed, the trigger 420 protrudes upward.

As described above, the pushing member 330 presses the trigger 420 by means of the pressing force applied to the pushing member 330 of the lever 300 by the latch 200 accommodated in the hook accommodating space 180 in the state where the hook member 230 of the latch 200 is held by and fixed onto the inner inclined surface 112. In the state where the latch 200 does not press the pushing member 330, and the pushing member 330 alone presses against the trigger 420, for the reason that the latch 200 is released from the latch passage 110, and the like, the pushing member 330 does not have sufficient force to press and activate the trigger 420. That is, the force applied upward by the trigger 420 is weaker than the pressing force applied by the latch 200, but stronger than the pressing force applied solely by the pushing member 330.

The latch 200 may be provided on both sides of the door, and a latch holder provided with an outer inclined surface 111 and an inner inclined surface 112 as a lock for the latch may also be disposed on both sides of an opening of a cavity opened and closed by the door in the main body of the cooking appliance. Also, the opening sensing switch 400 may be provided in both latch holders. Thus, the controller may determine that the door of the cooking appliance is open and may prevent the cooking appliance from operating, as long as the triggers of both opening sensing switches 400 are not simultaneously pressed.

An automatic latch release structure including the lever, the pusher, and the like according to the above-described embodiment may be provided in any one of the both latch holders. Accordingly, the opening sensing switch 400 in one latch holder may be indirectly pressed by the lever 300 when the latch 200 is accommodated and presses against the pushing member 330 of the lever 300, and the opening sensing switch in the other latch holder may be directly pressed by the latch when the latch is accommodated.

Figure 5:
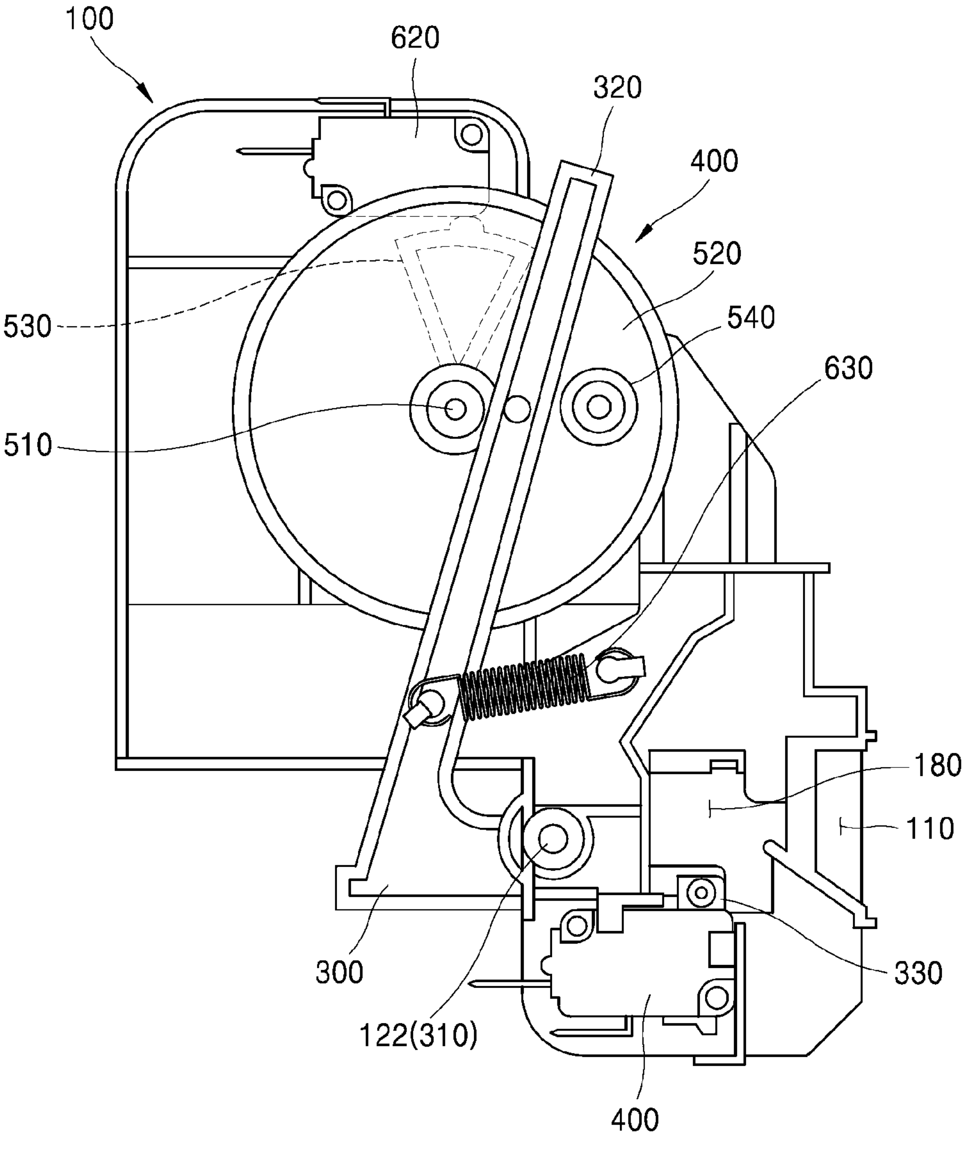
FIG. 5 is a side view illustrating the latch holder in FIG. 1.

Referring now to FIG. 5, in the state where the hook member 230 of the latch 200 is accommodated in the hook accommodating space 180, i.e., the state where the door of the cooking appliance is closed, the pushing member 330 of the lever 300 is pressed by the hook member 230, which, in turn presses the trigger 420 of the opening sensing switch 400. In this case, the lever 300 is rotated most clockwise around the lever shaft supporter 122.

Figure 6:
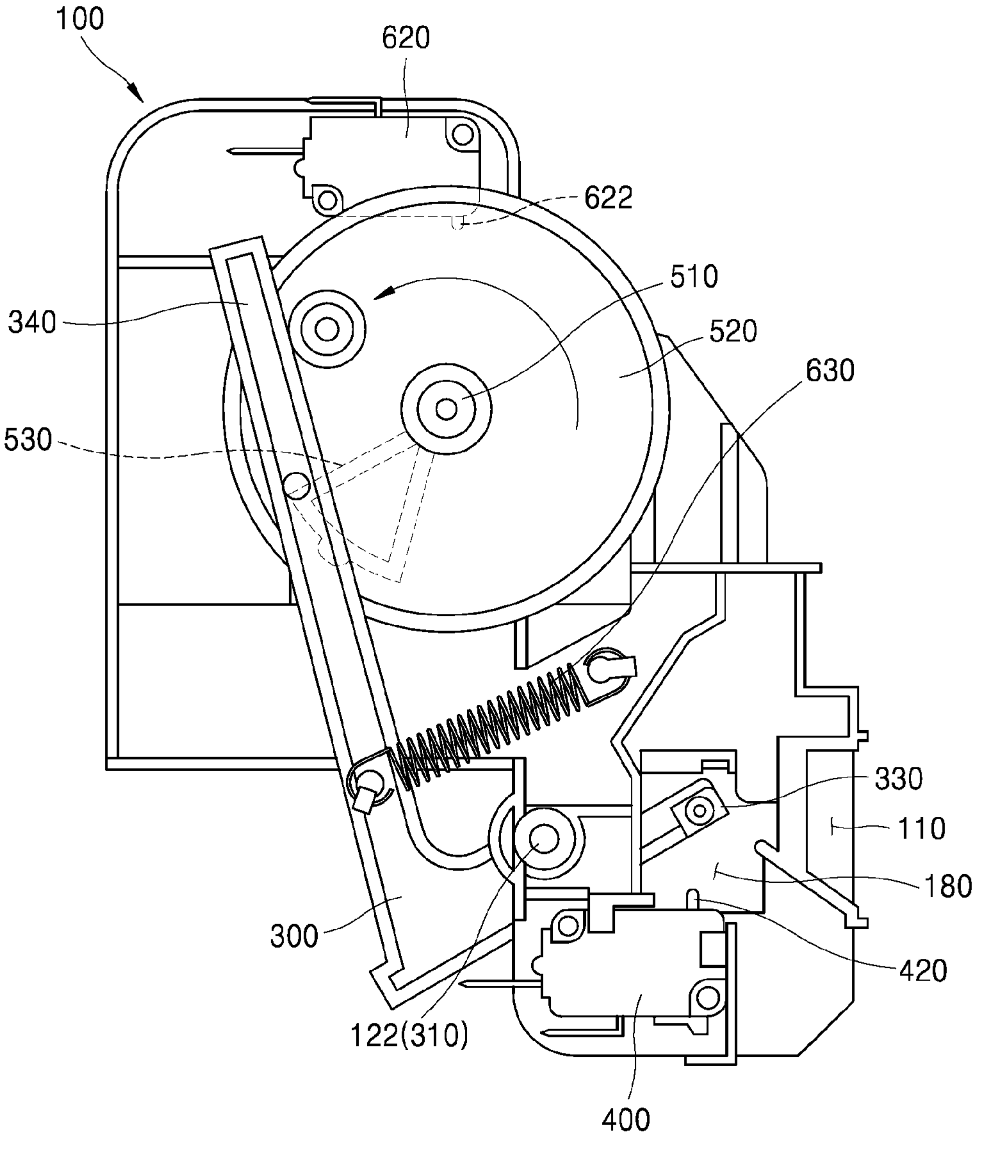
FIG. 6 is a view illustrating a state where a pusher in FIG. 5 pushes the lever and the pushing member of the lever is lifted.

When the user inputs an instruction to release the hook member 230 of the latch 200 from the hook accommodating space 180, i.e., an instruction to open the door of the cooking appliance, the motor 610 rotates, which rotates the pusher 500, as shown in FIG. 6. According to the embodiment, the pusher 500 rotates counterclockwise although the rotational direction of the pusher is not concerned. As the pusher 500 rotates, the lever 300 is pushed by the pusher cam 540, which rotates counterclockwise around the lever shaft supporter 122. Then the pushing member 330 is lifted upward angularly, and the hook member 230 of the latch 200, which was resting on the pushing member 330 is also lifted.

When the pusher 500 further rotates, the pusher cam 540 further pushes the effort arm 340 of the lever 300 to the rear end until the pusher cam 540 has rotated sufficiently such that it no longer contacts the effort arm 340. The pusher 500 continues to rotate to the position in FIG. 7 where the pressing boss 530 presses the trigger 622 of the return/stop switch 620 and then stops. The lever 300 then rotates clockwise around the lever shaft supporter 122 by means of the return spring 630 and returns to the initial position the lever has started from.

Figure 8:
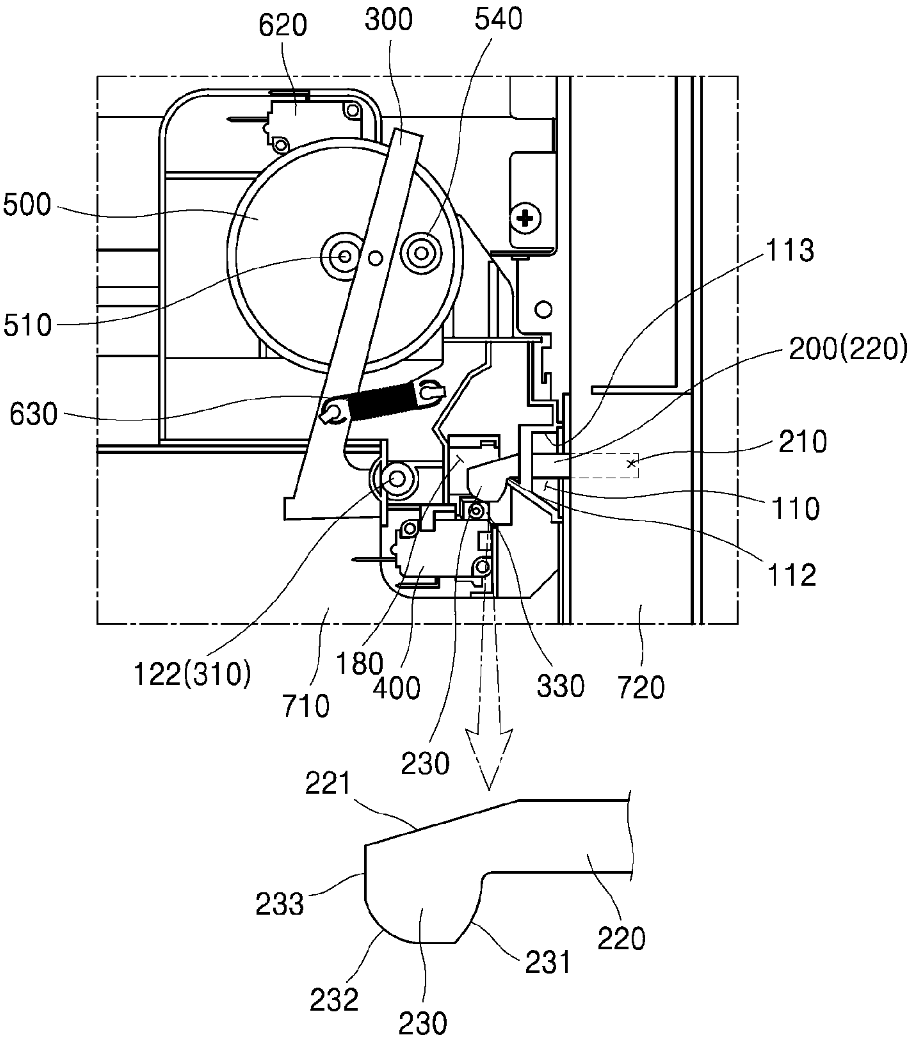
FIG. 8 is a side view illustrating a state where a door of a front of a cavity of a cooking appliance in which the latch holder is installed is closed and the latch is inserted into and fixed in the latch holder.
Figure 11:
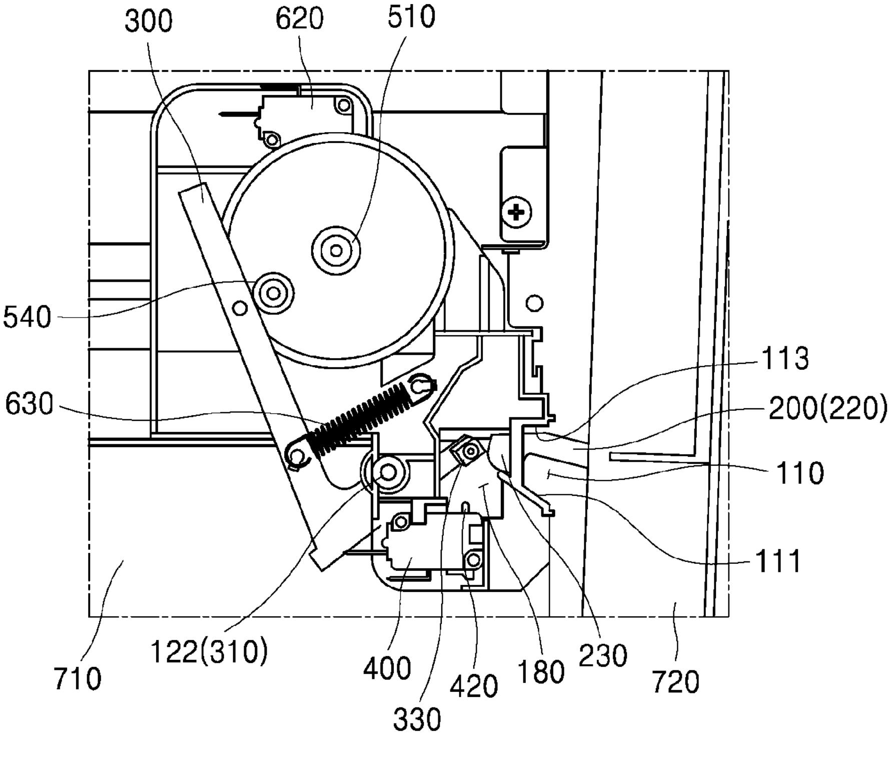
FIG. 11 is a view illustrating a state where the latch moves downward and is disposed onto an outer inclined surface after the latch is pushed away.

With reference to FIGS. 8 and 11, a process of automatically opening the door of the cooking appliance having the latch holder 10 that operates as described above will be described.

The latch 200 used together with the latch holder 10 of the present disclosure, as shown in FIG. 8, is installed so as to swivel vertically and angularly about a horizontal pivot axis 210 and includes a latch bar 220 where elasticity is applied downward via a spring (not shown) and the hook member 230 protrudes and extends downward from the distal end of the latch bar 220.

The latch 200 has an upper inclined surface 221 in the upper part of the distal end thereof, and the upper inclined surface 221 has a surface shape smoothly (e.g., linearly) inclined downward toward the distal end of the latch. The upper inclined surface 221 is a surface slidably contacting the upper ceiling 113 of the latch passage 110 when the latch 200 is moved upward and supported forward by the lever 300, for example, when the door is prevented from opening due to unexpected problems.

The hook member 230 includes a distal end flat surface 233 with a flat surface shape provided at the distal end thereof, and a low distal end inclined surface 232 with a curved surface shape provided in the lower part of the distal end flat surface 233. Additionally, the hook member 230 includes a rear inclined surface 231 with a curved surface shape, contacted and held by an inner inclined surface 112 of the latch passage 110, at the rear surface thereof.

The latches 200 provided on the left and right of the door may both have the shape described above.

An this embodiment, even though the lever 300 of the latch holder 10 on one side of the door pushes the latch 200 upward and forward, the latch on the other side of the door is not linked to and swivels with the latch on the one side of the door with the lever 300. However, the opening force of the door is exerted to the other side of the door by means of the pushing force applied by the lever 300 to the latch on the one side of the door. Accordingly, the rear inclined surface 231 of the hook member 230 of the latch 200 on the other side of the door is released and escapes from the other latch holder while riding on the inner inclined surface 112 of the other latch holder.

The curved surface shape of rear inclined surface 231 provides for manually opening the door. When the user pulls the door forward, the latch 200 escapes from the latch passage 110 while the rear inclined surface 231 of the hook member 230 of the latch 200 on respective both sides of the door ride on the inner inclined surface 112 of the latch passage 110. The present disclosure provides a device that includes a lever 300, a pusher 500 and a pusher driver 600 in a latch holder 10 on one side of the main body and allows a latch 200 to automatically escape from a passage for a latch. However, there are times when the door has to be manually opened due to, for example, a power outage, a failure of a cooking appliance, servicing, and the like. Accordingly, the present disclosure includes a rear inclined surface 231 formed in a hook member 230 of both latches 200 so as to manually open the door, and an inner inclined surface 112 and an outer inclined surface 111 provided in both the latch holders.

FIG. 8 illustrates the state where the hook member 230 of the latch 200 is drawn into the hook accommodating space 180, and the rear inclined surface 231 of the latch 200 is held by the inner inclined surface 112, i.e., the state where the door is closed. In the state where the door is closed, the lower surface of the hook member 230 rests on the upper surface 334 of the pushing member 330 of the lever 200. The pushing member 330 presses the trigger 420 of the opening sensing switch 400 by means of the force applied downward by the hook member 230.

Latch holders 10 are installed on both sides of the main body. If the door is normally closed, opening sensing switches 400 of the two latch holders 10 are both pressed. Accordingly, the controller 90 of the cooking appliance may confirm that the door is closed. When the user manipulates the control panel installed on the front surface of the door, the cooking appliance may start to cook.

When the user inputs an instruction to open the door to the control panel such as a display, a touch panel, and the like installed on the front surface of the door, the door may automatically open. In order for the door to automatically open, one latch 200 of the door, locked by the latch holder 10 on one side of the main body, has to be released, and, also, the other latch of the door, locked by the latch holder 10 on the other side of the main body has to be released.

To this end, the controller 90 rotates the motor 610. When the motor 610 rotates, the pusher 500 rotates, and the pusher cam 540 rotates and pushes the effort arm 340 of the lever 300 backward, as in FIG. 9. Accordingly, the lever 300 rotates counterclockwise about the shaft 310, and the pushing member 330 at the front of the lever 300 moves upward and forward. According to the embodiment, when the lever 300 rotates, the pushing member 330 swivels forward and upward because the shaft 310 of the lever 300 is placed further backward and upward than the pushing member 330.

In this case, the distance between the shaft 310 and the effort arm 340 is longer than the distance between the shaft 310 and the pushing member 330. Thus, the force of the motor 610 is increased and delivered to the pushing member 330.

The pushing member 330 itself slightly rotates because the pushing member 330 moves upward while revolving around the shaft 310. Thus, the push-up inclined surface 333 of the pushing member 330 moves the latch 200 forward and upward while contacting the low distal end inclined surface 232 of the latch 200. An outer insertion member 332 of the pushing member 330 is preferably made from a material having lubricativity and high wear resistance so as to allow the push-up inclined surface 333 to contact the low distal end inclined surface 232 and smoothly move. The movement is sensitive to the path of the lever and latch. Accordingly, when the pushing member 330 is made from a material causing friction or having low wear resistance, the latch 200 may damage the pushing member 330, and the pushing member 330 may not move the latch 200 upward.

When the pushing member 330 pushes the latch 200 forward and moves the same upward while moving upward, the trigger 420 of the opening sensing switch 400 is released from the press of the pushing member 330.

Additionally, the hook member 230 of the latch 200 passes over the inner inclined surface 112 and moves toward the outer inclined surface 111.

As the pushing member 330 continues to move upward, the push-end part 336 that is the lowest edge of the push-up inclined surface 333 finally pushes the hook member 230 over the inner inclined surface 112 and the latch 200 swivels downward by elasticity of the latch 200, as in FIG. 11.

The force of the latch 200 swiveling downward is converted as force in the horizontal direction while the latch 200 slides down the outer inclined surface 111, and the door is opened further forward.

When there is an obstacle, and the like blocking the path where the door opens, a large amount of the force of opening the door may be required in the direction in which the door opens. In this case, even though the pushing member 330 moves upward, the latch 200 may only move upward with the pushing member 330 and the latch 200 may not move forward.

Figure 10:
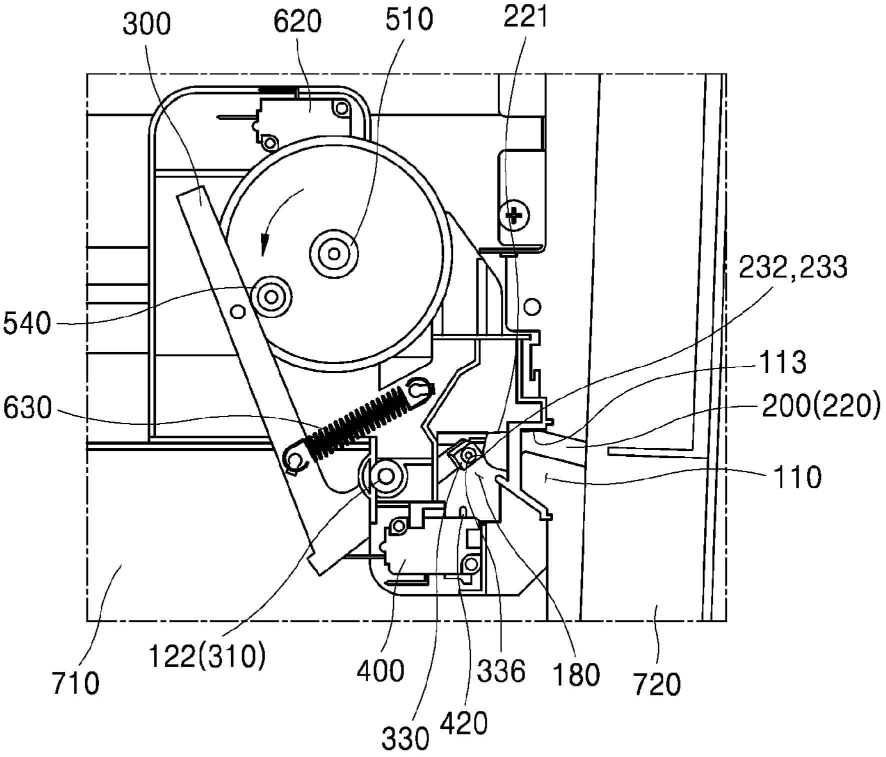
FIG. 10 is a view illustrating a process in which the push-end part of the lever pushes the latch after the process of lifting the latch in FIG. 9 further proceeds.

Even in this case, the upper inclined surface 221 of the latch 200 contacts the upper ceiling 113 of the latch passage 110, as in FIG. 10. When the pushing member 330 moves further upward in the state where the latch 200 contacts the upper ceiling 113, the push-end part 336 that is the lowest edge of the push-up inclined surface 333 finally pushes the lever 300 farthest away, as in FIG. 10. Then the upper inclined surface 221 of the latch 200 is pushed outward while contacting the upper ceiling 113 of the latch passage 110 and may move.

The upper inclined surface 221 may entirely contact the upper ceiling 113 such that the upper inclined surface 221 smoothly contacts the upper ceiling 113 and slides. To this end, when the latch 200 is lifted, the upper inclined surface 221 contacting the upper ceiling 113 may be approximately horizontal.

If the upper inclined surface 221 does not contact the surface of the upper ceiling 113 entirely but is inclined slightly to one side, the latch is not naturally drawn unlike the latch of the upper inclined surface 221 that is horizontal.

Figure 9:
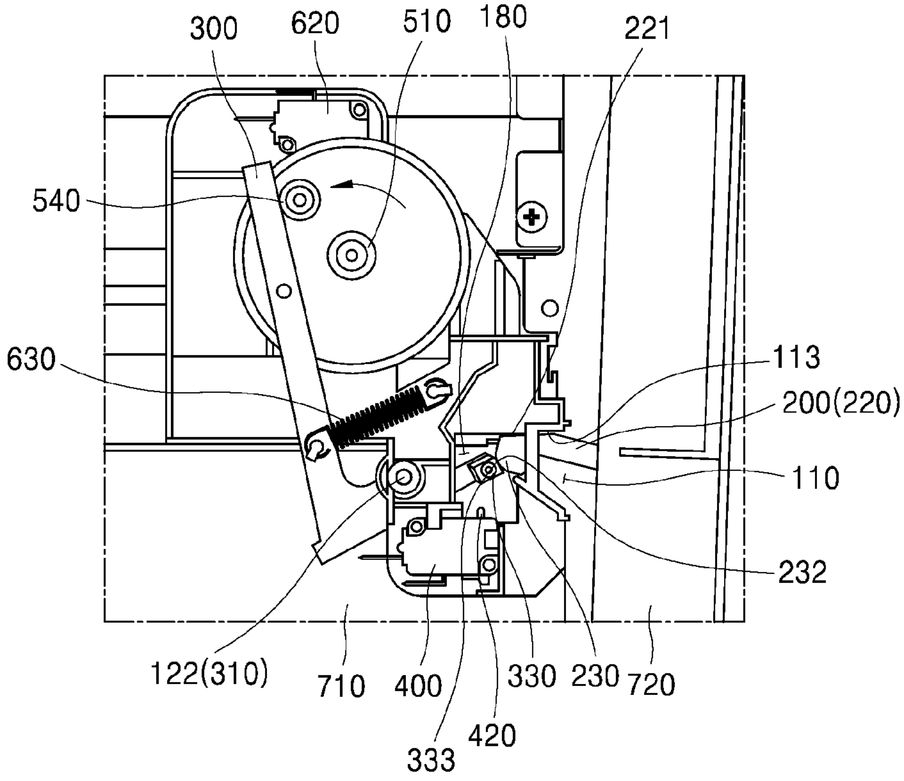
FIG. 9 is a view illustrating a process in which the pusher pushes the lever such that a push-up inclined surface of the pushing member of the lever lifts the latch in FIG. 8.

According to the embodiment, when a small amount of the opening force of the door is required, the latch 200 may move in order of FIG. 8, FIG. 9 and FIG. 11 and then may escape from the latch holder 10. Even when a large amount of the opening force of the door is required, the latch 200 may move in order of FIG. 8, FIG. 9, FIG. 10 and FIG. 11 and then may escape from the latch holder 10. That is, in any case, the door may automatically open. Also, even though there is a deviation in opening force applied to the door for an automatic opening due to a deviation in forces applied by the spring 823 of the hinge module 800 (see FIG. 14) in the direction in which the door is closed depending on products, the latch holder 10 described above may definitively unlock the latch.

As in FIG. 11, since the force of the latch 200, reaching a position where the latch is unlocked by the lever 300 and swiveling downward, is converted in the horizontal direction while the latch passes the outer inclined surface 111, the door opens further forward and smoothly opens.

Figure 18:
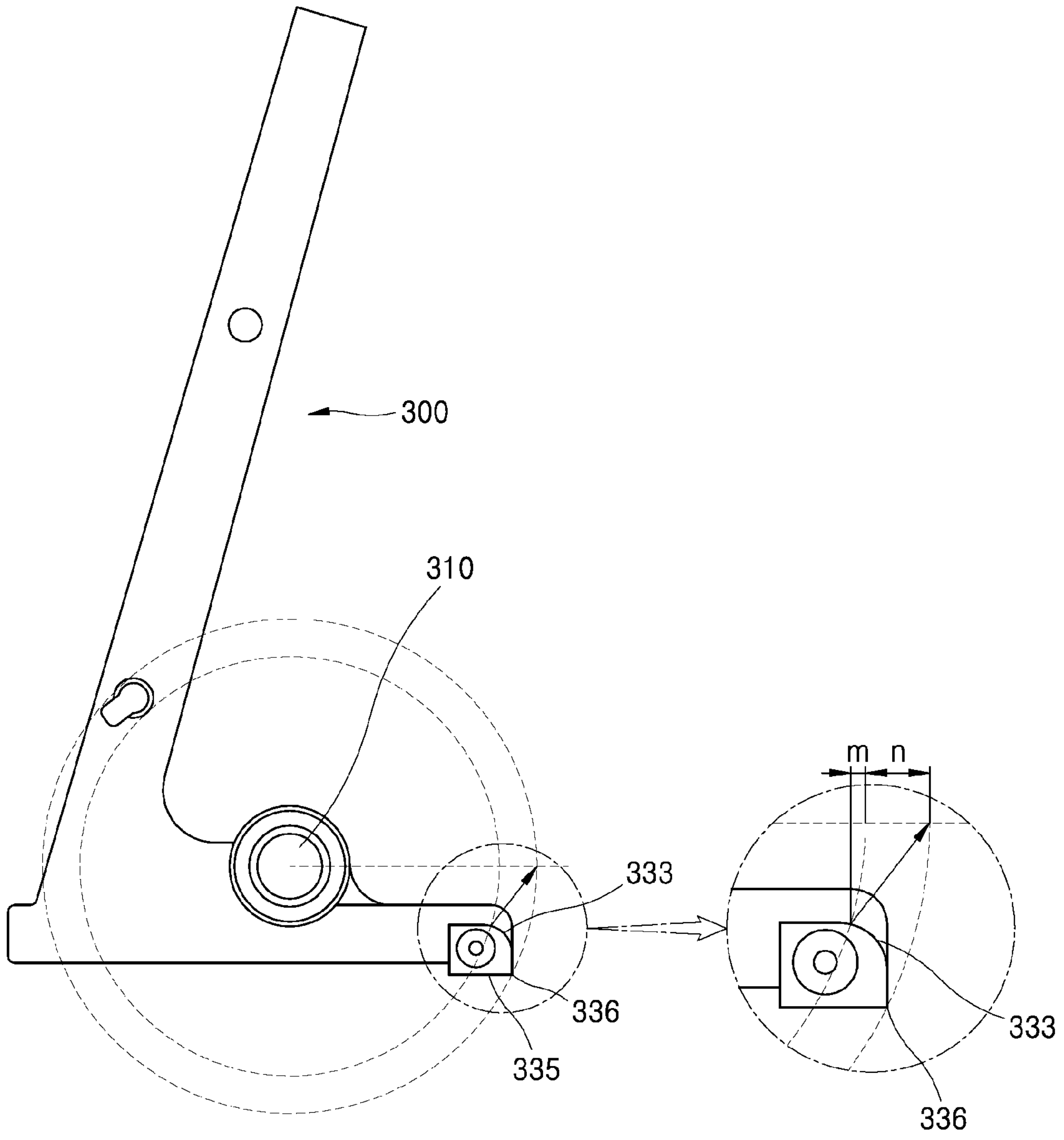
FIG. 18 is a view illustrating a geometric shape of a lever according to an embodiment of the invention.

With reference to FIG. 18, when the lever 300 rotates around the shaft hole 310, the upper end of the push-up inclined surface 333 starts to move the latch 200 upward while contacting the hook member 230 of the latch 200 and moving. Next, as the lever 300 rotates further counterclockwise, the position of the hook member 230 contacting push-up inclined surface 333 moves to the lower part of the push-up inclined surface 333. When the lever rotates further counterclockwise and the push-end part 336 moves to a height the same as that of the shaft hole 310, the lever 300 has pushed the hook member 230 farthest away from the pushing member 330. That is, as the lever 300 rotates counterclockwise, the push-up inclined surface 333 lifts the hook member 230 and moves the hook member 230 upward in the direction of the arrow in FIG. 18 while pushing the hook member 230 towards and onto the push-end part 336.

When the push-end part 336 is or above a height the same as that of the shaft hole 310, the hook member 230 is released and the latch 200 escapes from the path of the pushing member 330. Then the latch 200 falls downward due to elasticity of the latch, as in FIG. 11. That is, the latch 200 contacting the upper ceiling 113 moves downward again. In this case, the latch 200 is on the outer inclined surface 111 because the latch has been pushed further forward from the end of the arrow in FIG. 18. That is, the hook member 230 of the latch 200 is no longer held by the inner inclined surface 112, and the lower part of the hook member 230 moves downward, sliding on the outer inclined surface 111, as the door opens.

As the pushing member 330 moves upward to the height the same as that of the shaft hole 310, the upper end of the push-up inclined surface 333 moves forward from an initial position by m because the pushing member 330 is disposed in the front lower part of the shaft hole 310. According to the embodiment, the low distal end inclined surface 232 of the latch 200 contacts the push-up inclined surface 333 and moves from the upper end of the push-up inclined surface to the lower end thereof. Thus, the latch 200 is pushed further forward by n.

FIG. 12 illustrates an opening angle (a1) of the door caused by the latch 200 being pushed outward. The door automatically opens by means of self-weight as the door is now not perpendicular to the front of the cooking appliance but is opened and inclined by an angle of a1, as illustrated. However, if a speed at which the door automatically opens by means of self-weight is not controlled, the speed may increase while the door opens, and the door might slam open. According to the embodiment, when the door 720 opens by a predetermined angle (a2), a damper starts to operate so as to slowly open the door at controlled speed to a final opening angle (a3), thereby preventing damage to the door and a hinge module 800 of the door and providing a comfortable feeling to the user when the user sees the door automatically opening and controllably.

Figure 7:
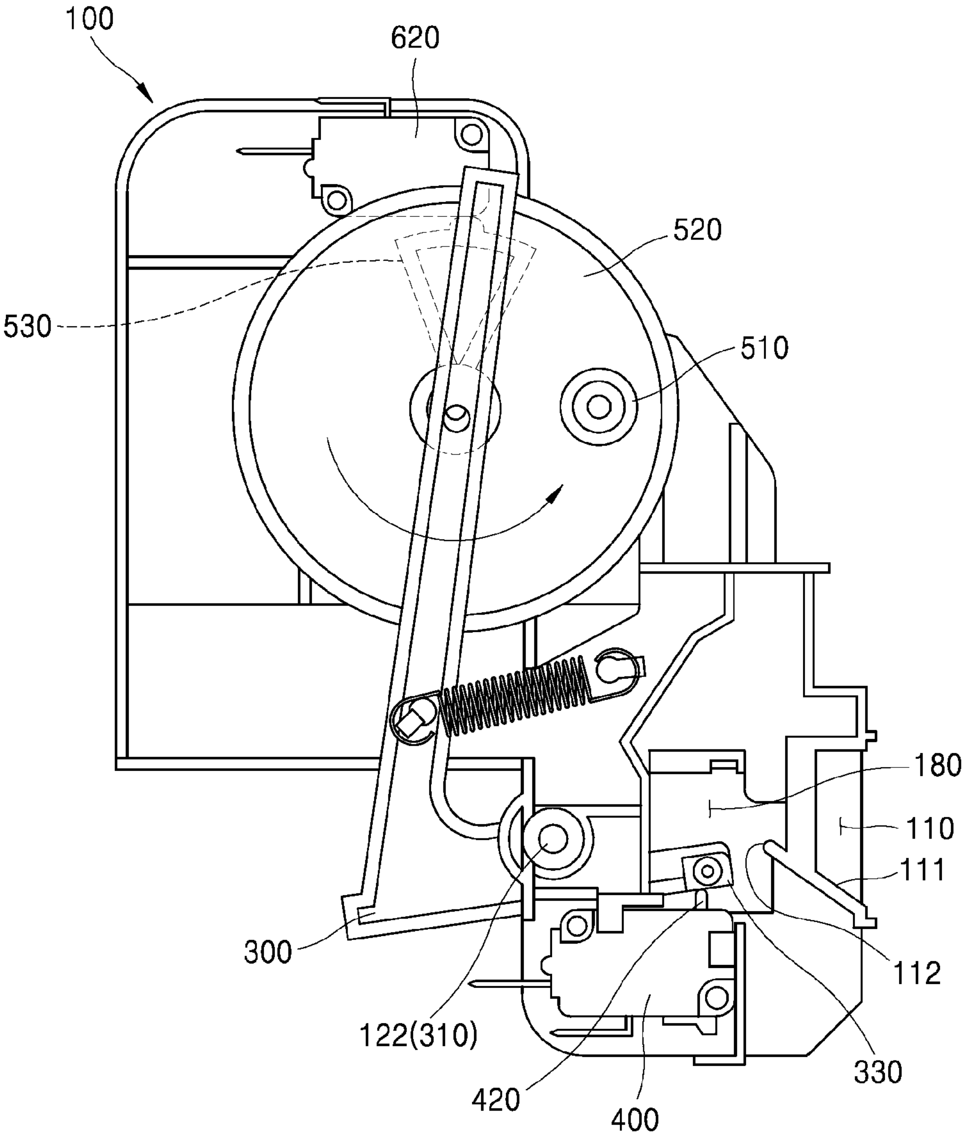
FIG. 7 is a view illustrating a state where the pusher and the lever are returned to initial positions thereof in the state where a latch is released.

When the user touches a touch panel, and the like in the upper part of the front surface of a door and inputs an instruction to open the door, the latch holder 10 operates in order of FIGS. 5 to 7. Accordingly, the latch 200 is released from the latch holder 10, and the door is pushed by a predetermined angle (a1) in order of FIGS. 8 to 11.

The predetermined angle (a1) may be set to the extent that the door automatically opens by means of self-weight. The angle (a1) may range from 1° to 7° and, preferably, 1° to 3°.

Referring to FIGS. 13 and 14, the hinge module 800 connects the main body 710 and the door 720. A door bar 840 of the hinge module is fixed to the door 720, and a housing 810 of the hinge module is fixed to the main body 710. The door bar 840 and housing 810 rotate around a rotational axis member 814.

As the door bar 840 rotates around the housing 810, damping force is delivered to the door bar 840.

An inner link housing 830 capable of moving in a lengthwise direction of the housing is provided in the housing 810. The distal end of the inner link housing 830 is hinge-coupled to the door bar 840 by a door bar connecting hinge 831. Accordingly, when the door 720 (door bar 840) opens, the door bar connecting hinge 831 moves forward while revolving around the rotational axis member 814 because the door bar connecting hinge 831 is eccentrically placed from the rotational axis member 814 by a distance of r. Accordingly, the inner link housing 830 moves forward in the housing 810.

A maximum opening angle (a3) of the door or the door bar is 90° because the door 720 or the door bar 840 opens from the position where the door or the door bar perpendicularly stands to the position where the door or the door bar lies forward and horizontally. Accordingly, the connecting hinge 831 revolves 90° around the rotational axis member 814. The inner link housing 830 moves forward by a horizontal distance (d3) resulting from the 90 degree revolving of the rotational axis member 814.

A spring insert pin 820 is installed at the rear of the inner link housing 830. The spring insert pin 820 is connected with the rear of the inner link housing 830 by an inner housing link pin 822. Both ends of the inner housing link pin 822 are fitted into a link pin guide slot 815 in the housing 810. The link pin guide slot 815 has an elongated hole shape extending in the lengthwise direction of the housing 810.

The spring insert pin 820 is inserted into a compression coil spring 823 that has excellent elasticity and is already in the state of being compressed. The spring insert pin 820 may penetrate a spring stopper plate 811 fixed to the housing 810 and slide in the lengthwise direction of the housing 810. However, the distal end of the compression coil spring 823 is held by the spring stopper plate 811 of the housing 810. A spring stopper plate support pin 812 for additionally supporting the spring stopper plate 811 may be further installed in the housing 810 so as to support the spring stopper plate 811 from the force applied by the compression coil spring 823.

A spring support pin 821 for fixing the rear end of the spring 823 is installed at the rear end of the spring insert pin 820. The spring support pin 821 does not interfere with the housing 810.

When the door bar 840 opens, the inner link housing 830 and the spring insert pin 820 may move forward while the inner housing link pin 822 is guided by the guide slot 815 of the housing 810. Accordingly, the elasticity of the spring 823 becomes greater while the spring is compressed between the spring stopper plate 811 and the spring support pin 821. A length of a compressed spring 823 corresponds to a distance (d3) horizontally moved by the rotational axis member 814. When the opening angle of the door is small, elasticity of the spring 823 is low while when the opening angle of the door increases, elasticity of the spring 823 increases. The elasticity is applied against the direction in which the door opens.

Force applied by the spring 823 in the direction in which the door is closed becomes greater from opening angle a1 to opening angle a3 of the door. The force applied by the spring 823 at opening angle a1 of the door is smaller than the force that the door automatically opens by means of the self-weight (opening force) at opening angle a1. Thus, the door pushed by the lever 300 to the opening angle a1 automatically opens.

A damper 850 is installed in the inner link housing 830. A piston 851 of the damper 850 is supported by a damper presser 832 integrally fixed to the inner link housing 830. The piston 851 is inserted into a cylinder 852. A slot 853 into which a damper support pin 813 fixed to the housing 810 is fitted is provided in the upper part of the cylinder 852. The cylinder 852 may move forward and backward as far as a length of the slot 853. FIG. 14 illustrates positions of the slot 853 of the damper 850 and the damper support pin 813 of the housing 810 in the state where the door is closed.

As the door opens and swivels by a predetermined angle (a2), the inner link housing 830 moves by d2 forward and horizontally, and the damper 850 moves together with the inner link housing while being pushed forward by the damper presser 832 of the inner link housing 830. When the damper is pushed forward, the damper presser 832 pushes the piston 851 of the damper 850 forward. However, the slot 853 of the cylinder 852 is not yet held by the damper support pin 813. Accordingly, the damper 850 moves forward together with the inner link housing 830 but does not generate any damping force.

At the moment when the opening angle of the door exceeds a2, the slot 853 of the damper 850 moving forward is held by the damper support pin 813, and then the damper 850 starts to be compressed as the piston 851 presses into the cylinder 852. The damping force, generated when the damper 850 is compressed, damps the opening force of the door in a range of opening angles of a2 to a3, thereby controlling the opening force of the door.

A maximum damping distance (Lmax) of the damper 850, i.e., a maximum stroke for generating damping force while the damper is compressed, is set to be greater than or equal to a distance (d3-d2) moved by the inner link housing 830 while damping force is applied to the door.

Specifically, while a closed door opens to a2, the door bar connecting hinge 831 also rotates by a2. Accordingly, the inner link housing 830 and the spring insert pin 820 move forward by d2. While the inner link housing 830 and the spring insert pin 820 move by d2, the slot 853 of the damper 850 rides on the damper support pin 813 and moves. Thus, the damper is not pressed. That is, elasticity of the spring 823 is applied against the direction where the opening force of the door is applied in a range of opening angles of the door of 0 to a2 so as to lower the opening speed of the door.

While a closed door opens to a3, the door bar connecting hinge 831 rotates by a3, and the inner link housing 830 and the spring insert pin 820 move forward by d3. Accordingly, the spring 823 is compressed by d3. That is, elasticity of the spring 823 is applied against the direction where the opening force of the door is applied in a range of opening angles of the door of 0 to a3 so as to lower the opening speed of the door.

The maximum opening angle (a3) may be controlled by the link pin guide slot 815 of the housing 810 controlling a distance at which the inner housing link pin 822 slides.

The damper 850 may continue to damp the opening force of the door, for instance, from the opening angle of the door, which is about 30° to 40° to the opening angle of the door, which is about 90°. Thus, the door may open to an initial opening angle (a1) by a latch holder 10, then open by means of the self-weight at an accelerated speed and when the door opens to a2 (about 30° to 40°), is slowed by means of the damping force of the damper. The door opening method ensures a comfortable feeling for the user.

If damping starts too fast while the door is opening, the door opens too slowly. This makes the user feel uncomfortable. Conversely, if damping of the door starts too late, the door opens too fast until the door has opened to a considerable extent. This can make the user feel uncomfortable or hit against the door.

A damping start angle (a2) at which the damper 850 starts to damp the opening force of the door is preferably 35°±5° M this embodiment.

The damping force may continue until the door completely opens to 90° or until the door opens to 85° that is 5° less than 90°. If the damping force is applied even in a section where the door completely opens, the door might open to 88° to 89° that is 1° to 2° less than 90°. Thus, in one embodiment, it can be considered that damping force is not applied at an angle of greater than 85°.

The damping start angle (a2) is set to be greater than a forcible opening angle (a1). Additionally, a section between the forcible opening angle (a1) and damping start angle (a2), i.e., a section from 1-7° to 30-40°, is a section where the opening force of the door is not damped by any damper 850 and where the door automatically opens by means of the self-weight. The elasticity of the spring 823 may be applied against the direction in which the door opens in this section. Thus, the acceleration of the door may be reduced or prevented in the section where the door automatically opens by means of the self-weight.

Applying the above-described automatic door opening structure makes the user feel less uncomfortable and enhances emotional quality of a product. Further, a handle protruding from the door may be removed, thereby providing aesthetic qualities to a cooking appliance, in particular, a built-in cooking appliance.

A damper for the door of a building is a mechanical element that prevents the door from slamming shut while a spring applies force in the direction where the door is closed. The elasticity of the spring applied in the direction where the door is closed is maximized when the door opens to a maximum angle and is gradually minimized as the door is gradually closed. When a damper providing a proper level of damping force is installed, as the door is gradually closed, the elasticity of the spring applied in the direction where the door is closed is gradually minimized. Thus, the damping force of the damper significantly affects the speed at which the door is closed, and the speed at which the door is closed is gradually lowered.

On the contrary, when a damper is closed while a door with a pull-down type opening structure as in the present disclosure opens, the opening force of the door consists of moment by means of the self-weight of the door. Unlike building doors, an automatic door opening system of the present disclosure is a system in which the opening force increases as damping performed by a damper proceeds.

Figure 17:
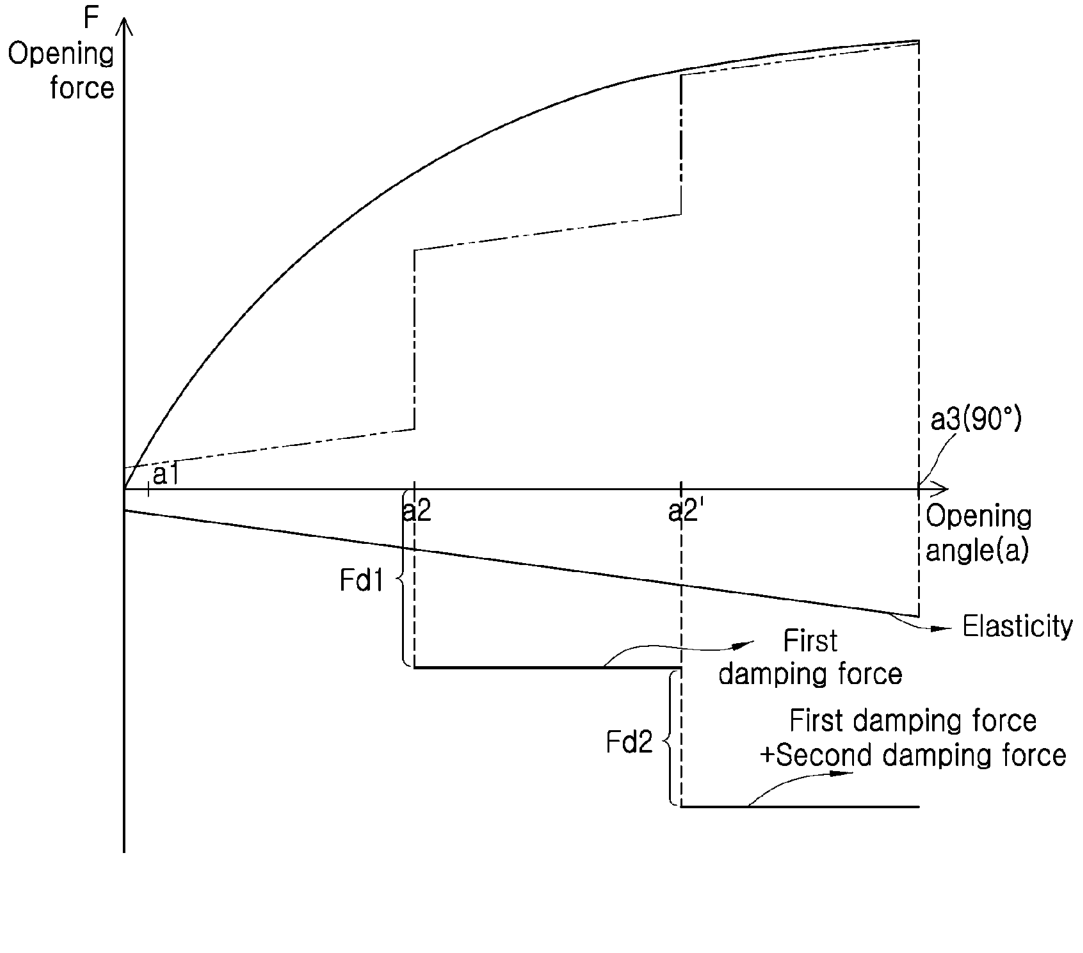
FIG. 17 is a view illustrating an opening force of the door, resistance of a spring against the opening force and damping force of a damper based on an opening angle of the door.

Referring to FIG. 17, the opening force applied by the self-weight of a door may be defined as a sign function of the opening angle of the door. On the contrary, the force of preventing an opening, applied by a spring 823, may be defined as a linear function of a spring constant. The damping force of the damper is proportional to the speed of damped movement. However, according to the present disclosure, the damping force of the damper may be expressed as a constant because the door is controlled so as to fall nearly at a fixed speed.

That is, the damping force is constant regardless of the opening angle of the door. Accordingly, the damping coefficient of a damper has to be very large so as to provide enough damping force against a large opening force applied at the moment when the door is close to opening. However, when the damping coefficient of a damper is large, an initial opening is performed very slowly or is not smoothly performed because the damping force against the opening force increases in the step of the initial opening. That is, when the damping force (Fd1) of a damper is too large, the initial opening is not smoothly performed, while when the damping force (Fd1) of a damper is small, the damping force does not withstand the opening force that increases in accordance with an increase in an opening angle.

Accordingly, the present disclosure presents a way of designing different hinge modules 800 provided respectively in two hinges of a pull-down door. For instance, as in FIG. 14, a damper 850 in one hinge module 800 starts damping with a first damping force (Fd1) at a damping start angle (a2) while as in FIGS. 15 and 16, a damper 850 in the other hinge module 800 starts damping with a second damping force (Fd2) at an additional damping start angle (a2') following the damping start angle (a2).

Accordingly, enough damping force (Fd1+Fd2) to damp the opening force increased in accordance with an increase in the opening angle is applied at an additional damping start angle (a2'). As a result, an increased opening force too large for one damper to withstand may be damped.

The additional damping start angle (a2') may be about 60° to 80°, i.e. 70°±10°.

Figure 15:
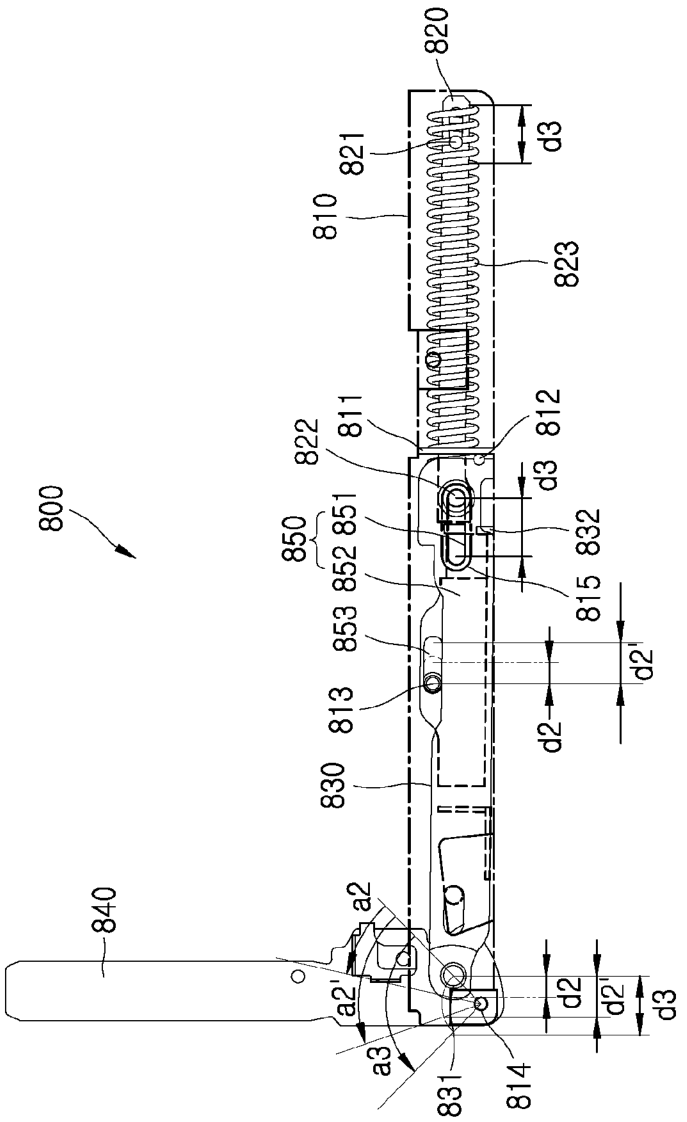
FIG. 15 is a view illustrating a structure in which a slot of a cylinder extends so as to delay interference of a damper in an opening of the door in the structure of the door hinge.

Referring to FIGS. 14 and 15, a length (d2') of a slot 853 of a cylinder 852 of a damper 850 of the hinge module 800 that starts damping at an additional damping start angle (a2') in FIG. 15 may be longer than that of a length (d2) of a slot 853 of a cylinder 852 of a damper of the hinge module 800 that starts damping at a damping start angle (a2) in FIG. 14. A distance (r) between a rotational axis member 814 and a door bar connecting hinge 831 of the hinge module 800 in FIG. 14 is the same as that of the hinge module 800 in FIG. 15. Accordingly, distances (d3) moved by inner link housings 830 are the same. However, distances (d2, d2') moved by the inner link housings 830 are different in the state where the damping force of the damper is not applied because of different lengths of the slots 853.

Additionally, a distance (r) between the rotational axis member 814 and the door bar connecting hinge 831 of the hinge module in FIG. 14 is the same as that of the hinge module in FIG. 15. Thus, damping forces generated at the same opening angle are the same. That is, damping force Fd1 and damping force Fd2 in FIG. 17 may be substantially the same.

Figure 16:
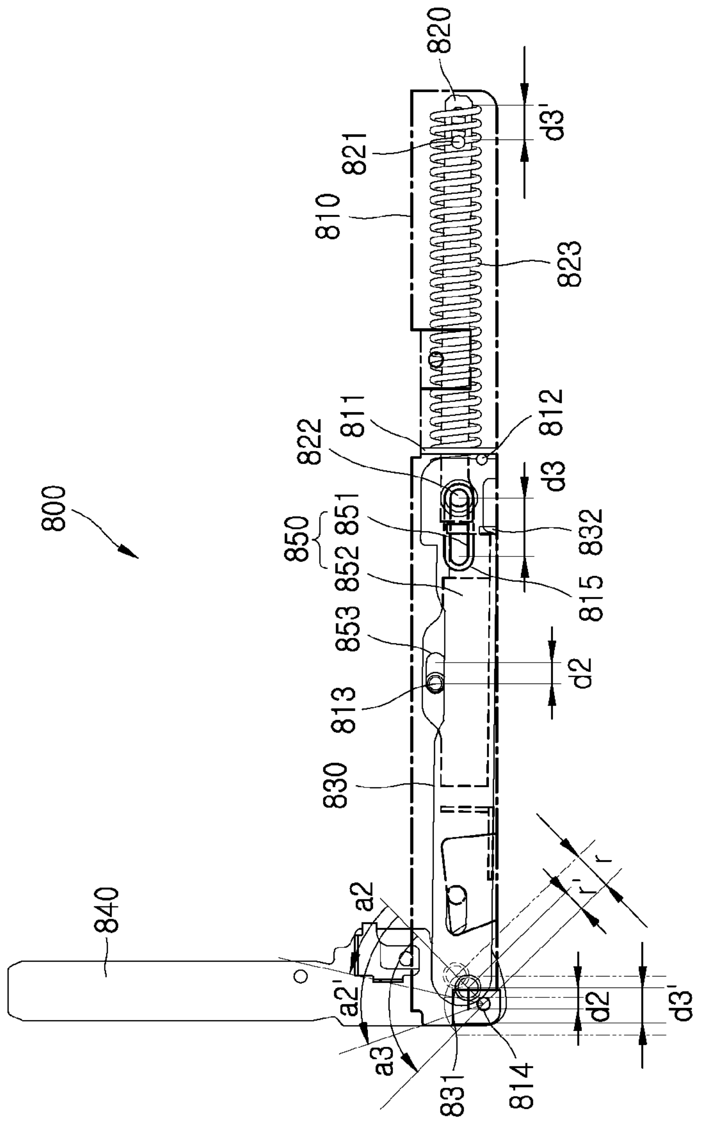
FIG. 16 is a view illustrating a structure in which a distance between a rotational axis member and a door bar connecting hinge is shortened so as to delay interference of a damper in an opening of the door in the structure of the door hinge.

Referring to FIGS. 14 and 16, a distance (r') between a rotational axis member 814 and a door bar connecting hinge 831 of the hinge module 800 that starts damping at an additional damping start angle (a2') in FIG. 16 may be shorter than that of the hinge module 800 that starts damping at a damping start angle (a2) in FIG. 14. That is, when a distance (r') between the rotational axis member 814 and the door bar connecting hinge 831 becomes shorter, a distance (d3') moved forward by an inner link housing 830 until the door completely opens becomes shorter. That is, the distance (d3') moved by an inner link housing 830 at the same opening angle is shortened as much as a shortened distance (r') between the rotational axis member 814 and the door bar connecting hinge 831.

Distances (d2) moved by inner link housings 830 to generate damping force are the same because lengths (d2) of the slots 853 of the cylinders 852 of the dampers 850 of two hinge modules 800 in FIGS. 14 and 16 are the same. However, there is a difference in the distances between the rotational axis members 814 and the door bar connecting hinges 831. Accordingly, swivel angles of the door 720 or the door bar 840 are different so as to move the inner link housing 830 by the same distance (d2). That is, in the hinge module 800 of FIG. 14, an opening angle of the door that has to swivel so as to move the inner link housing 830 by d2 is a2 while in the hinge module 800 of FIG. 16, an opening angle of the door that has to swivel so as to move the inner link housing 830 by d2 is a2'.

Meanwhile, a distance (r') between the rotational axis member 814 and the door bar connecting hinge 831 of the hinge module in FIG. 16 is shorter than that of the hinge module in FIG. 14. Accordingly, a damping distance of the damper in FIG. 16 is shorter than that of the damper in FIG. 14 at the same opening angle, and the damping force of the damper in FIG. 16 is smaller than that of the damper in FIG. 14. That is, the damping force generated when the hinge module in FIG. 16 swivels at the same opening angle is smaller than the damping force generated when the hinge module in FIG. 14 swivels at the same opening angle. To put it another way, in FIG. 17, Fd2 may be smaller than Fd1.

A damping force against an increasing opening force of a door may be supplied by means of a difference in the damping start angles of the hinge modules in both hinges of a pull-down door, as illustrated in the relationship between the hinge modules of FIGS. 14 and 15, and the relationship between the hinge modules of FIGS. 14 and 16.

The difference in damping start angles may be made by means of a difference in lengths (d2, d2') of slots 853 of cylinders or a difference in distances (r, r') between a rotational axis member 814 and a door bar connecting hinge 831 in the same hinge module structure, and the magnitude of damping forces (Fd1, Fd2) provided at the two damping start angles (a2, a2') may be adjusted by means of a difference in distances (r, between door bar connecting hinges 831.

Thus, even though opening forces are different based on the self-weight or size of doors, an optimum damping force against an increasing opening force of the door may be provided by means of a difference in lengths (d2, d2') of the slots 853 of the cylinders of the hinge modules respectively on both sides of the door or a difference in distances (r, r') between a rotational axis member 814 and a door bar connecting hinge 831, with no need to design a new hinge module.

In addition to different damping forces and damping start angles, the spring constant of a spring 823 (gradient in FIG. 17) and a degree of the initial compression of the spring (initial value in the graph of elasticity in FIG. 17) may be adjusted such that a door may open at controlled speed against the opening force of the door. The spring constant and the degree of the initial compression of the spring are preferably less than or equal to the opening force generated by means of the self-weight of a door at an initial opening angle (a1; angle at which a door opens after a latch holder pushes a latch) (resistance against opening force generated by a damper and a spring by adjusting damping force and spring constant is designated by the two dot chain line in FIG. 17).

Below, a control method for an automatic opening of a door according to an embodiment will be described with reference to FIGS. 19 to 21. A controller 90 may perform the control method for the automatic opening of a door.

According to the embodiment, a door automatically opens by means of one rotation of a motor 610. While a motor makes one rotation, a pusher 500 rotates. Then, a pusher cam 540 eccentrically disposed in a pusher pushes a lever 300 and returns to an initial position. The lever 300 pushes a latch 200 forward and upward with the pusher cam 540. Then, the door automatically opens.

According to the structure of the above-described latch holder 10, the latch holder may be in four states in the state in which the cooking appliance according to the embodiment is powered off.

First, as in FIG. 8, the door is closed, the latch 200 is held in the latch holder 10, the lever 300 moves clockwise and is disposed at the end in a range of the swivel of the lever 300 by means of the pressing force applied downward by the latch 200, and the pusher 500 is in the correct position where the pusher 500 presses a return/stop switch 620.

Second, the door is open, and the pusher 500 is arranged in the correct position and presses the return/stop switch 620, as in FIG. 7.

Third, the pusher 500 stops rotating due to a power outage, and, as in FIG. 6, is not in the position where the pusher 500 presses the return/stop switch, and a pushing member 330 of the lever 300 is lifted, and the door is open. In the state of FIG. 6, the latch 200 may not come into the latch holder 10, and, accordingly, the door may not be closed because the pushing member 330 of the lever 300 blocks the inlet of the latch holder 10.

Fourth, the pushing member 330 slightly moves downward without blocking the inlet of a latch holder 10, and a pressing boss 530 of the pusher is in an initial state where the pressing boss does not press the return/stop switch 620. This state is between the state in FIG. 6 and the state in FIG. 7. In this state, the latch 200 may come into the latch holder. When the latch comes into the latch holder, the load of the latch presses the lever, and the lever is forcibly rotated and moves the pusher 500 while rotating. Accordingly, this state turns into the state in FIG. 8.

According to the embodiment, the pusher 500 makes one rotation so as to open the door. The pusher 500 starts to rotate in the correct position, i.e., the position in FIG. 8 and makes one rotation. When the pusher 500 makes one rotation, the pushing member 330 of the lever 300 makes exactly one upward movement, and, accordingly, the door automatically opens. If the pusher 500 starts to rotate so as to open the door in the state where the pusher 500 is placed in the position in FIG. 6, which is not in the correct position, credibility of an automatic opening of a door may not be ensured.

An this embodiment, when a cooking appliance starts to operate, for instance, when the cooking appliance is plugged into the socket, or the user presses the power button of the cooking appliance so as to turn on the cooking appliance, the controller 90 controls operation of the pusher 500 such that the pusher is in the correct position.

As in FIG. 7 or 8, when the pusher 500 has already pressed the return/stop switch 620 and the return/stop switch is on, the control 90 may confirm that the pusher has already been placed in the correct position. Thus, there is no need to arrange the pusher 500 in the correct position. If the pusher 500 is rotated so as to arrange the pusher in the correct position in the state where the door is closed, as in FIG. 8, the closed door might open.

In this case, a wait state is maintained until the user inputs an instruction to open the door.

When the pusher 500 is not in the correct position where the pusher has pressed the return/stop switch 620, as in FIG. 6, the door is open. Thus, even though the pusher 500 rotates so as to be arranged in the correct position, the closed door does not open.

Figure 20:
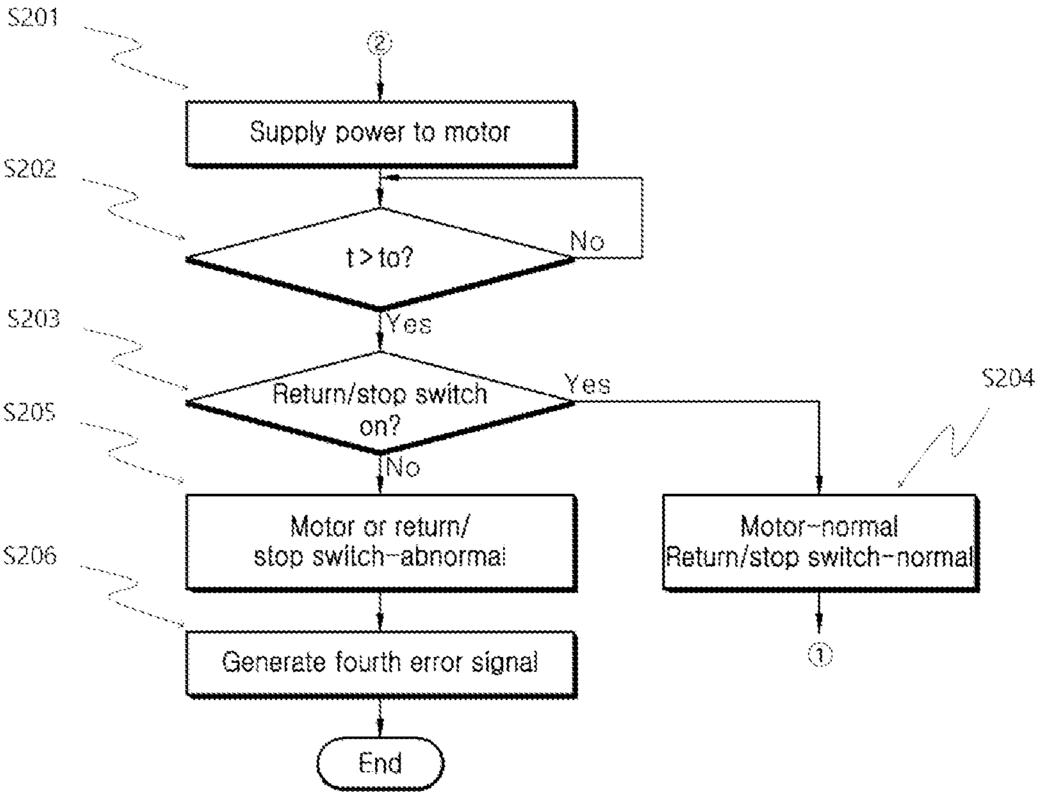

That is, when the cooking appliance starts to operate (when electric power is supplied to the cooking appliance or when the power button of the cooking appliance is turned on), if the controller 90 senses that the return/stop switch is off, that is, a return/stop switch is not pressed, the controller 90 arranges the pusher 500 in the correct position as in FIG. 20.

Below, a step of arranging a pusher to an initial correct position by supplying power to a motor is described. Preferably, uninterrupted power (possibly, alternating power) is supplied to a motor so as to rotate the motor evenly, instead of electric power (pulse power, and the like) for allowing a motor to rotate differently.

Referring now to FIG. 20, when electric power is supplied to the motor S201, the motor rotates, and the pusher 500 rotates and reaches to the position in FIG. 7, The pusher 500 presses the return/stop switch 620, and the power being supplied to the motor is cut off. In this instance, the pusher is arranged in the correct position.

The controller confirms whether the return/stop switch is pressed after a period of time long enough for the motor to make one rotation (to) S202. When the return/stop switch is pressed S203, the motor is normally operating, the return/stop switch is normally operating S204, and the pusher 500 is arranged in the initial correct position. In this case, a wait state is maintained until the user inputs an instruction to open the door as described above. See FIG. 19.

If the return/stop switch is not pressed even after the period of time (to) S203, the motor or the return/stop switch is operating incorrectly S205. As described above, in the state of FIG. 6, the door may not be closed. Accordingly, an opening sensing switch 400 is off, and the door is open. Thus, it is difficult to confirm whether the motor normally operates by confirming whether the door is open by means of the movement of the motor. Then the controller may generate a fourth error signal of a problem with the motor or the return/stop switch S206. Additionally, the controller may finish operation of the cooking appliance as a follow-up.

The state where the user's instruction to open the door is waited for after the pusher 500 is arranged in the correct position is the same as the state in FIG. 7 or FIG. 8. Even though an instruction to open the door is inputted, and the pusher 500 makes one rotation in the state of FIG. 7, i.e., in the state where the door is open, the product operates correctly.

Certainly, even though the user inputs an instruction to open the door in the state of FIG. 7, i.e., the state where the return/stop switch is pressed while the opening sensing switch is not pressed, electric power may not be supplied to the motor. However, noteworthy is that there is no need to react to the instruction to open the door based on each of the states in FIG. 7 and in FIG. 8 for simplifying control algorithm.

The door according to the embodiment may be opened automatically and manually. With this in mind, a control method for an automatic opening of the door will be better understood.

Figure 19:
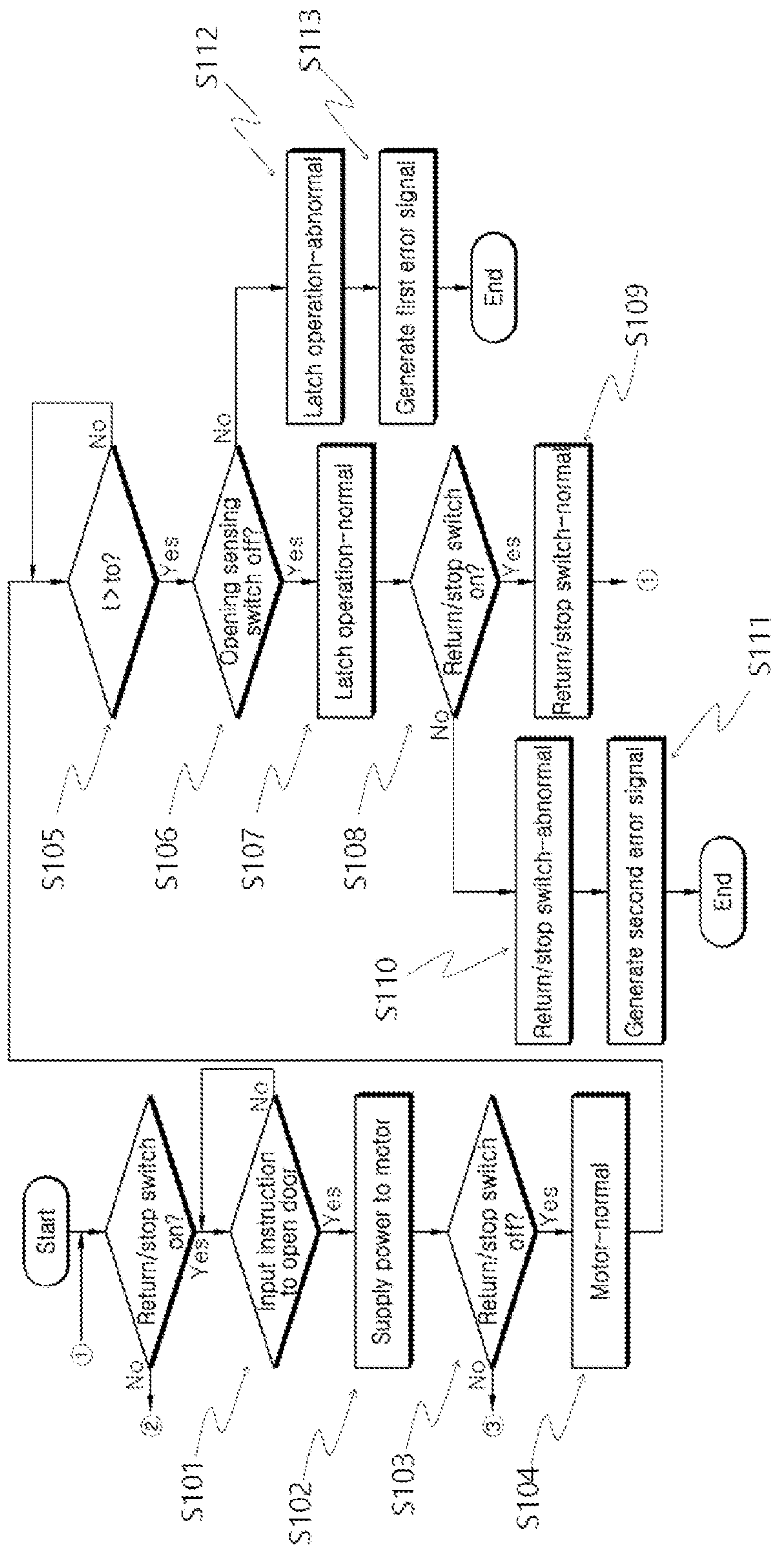
FIG. 19 is a flow chart illustrating a control method for an automatic opening structure of a cooking appliance according to an embodiment of the invention.

Referring now to FIG. 19, shortly after electric power is supplied to the motor with the user's instruction to open the door S101, S102, the controller 90 confirms whether the return/stop switch is turned off S103. When the return/stop switch is turned off, the motor has started to rotate normally S104.

After a period of time long enough for the motor to make one rotation (to) S105, i.e., the pusher 500 makes one rotation, the controller confirms that the opening sensing switch is off S106. In a state the same as the state of FIG. 8, the opening sensing switch that was on as the door opened is turned off, while in a state the same as the state of FIG. 7, the opening sensing switch is kept off. Thus, in any case, when the opening sensing switch is off after the predetermined period of time, the latch has normally escaped from the latch holder S107.

Next, after a period of time long enough for the motor to make one rotation (to), the controller 90 confirms that the return/stop switch is on again S108. If the motor has rotated and returned to the initial position normally, the return/stop switch is pressed. Accordingly, the return/stop switch is normally operating S109. Additionally, when the return/stop switch is pressed, electric power being supplied to the motor is immediately cut off. Thus, the pusher is placed in the initial correct position.

In this case, the controller is in the state of waiting for the user's instruction to open the door again.

When the return/stop switch is not turned on even after a period of time long enough for the motor to make one rotation, the motor or the return/stop is operating incorrectly S110.

If the return/stop switch is not turned on after the predetermined period of time while the opening sensing switch that was on is turned off (that is, the door has opened), during the predetermined period of time, the return/stop switch is operating incorrectly. In this case, the controller 90 may generate a second error signal of a problem with the return/stop switch and cut off the power being supplied to the motor S111.

It might be difficult to confirm which of the motor and the return/stop switch is operating incorrectly when the opening sensing switch is kept off during the predetermined period of time in the state where the door is open. In this case, the return/stop switch that was on is turned off when electric power started to be supplied to the motor. Thus, the return/stop switch is likely to operate incorrectly rather than the motor. Accordingly, the controller 90 may generate a second error signal of a problem with the return/stop switch and cut off the power being supplied to the motor.

That is, the controller 90 may confirm a problem with the return/stop switch and generate a second error signal when the return/stop switch is not turned on in any case.

Meanwhile, there are times when the opening sensing switch is on following a period of time long enough for the motor to make one rotation (to) after electric power is supplied to the motor with the user's instruction to open the door, and the return/stop switch is turned off. In this case, the door might be prevented from opening by an obstacle placed in the direction where the door opens, or by the latch incorrectly held by the latch holder, S112 while the motor is normally rotating. Then the controller 90 may generate a first error signal of a problem with the operation of the latch and cut off the power being supplied to the motor S113.

When the return/stop switch is not turned off even after electric power has been supplied to the motor with an instruction to open the door input by the user, the step of generating an error signal as in FIG. 20 may be required. In this case, there must be a problem with any one of the motor and the return/stop switch. Incorrect operation of any one of the motor and the return/stop switch may be confirmed using additional signals.

Figure 21:
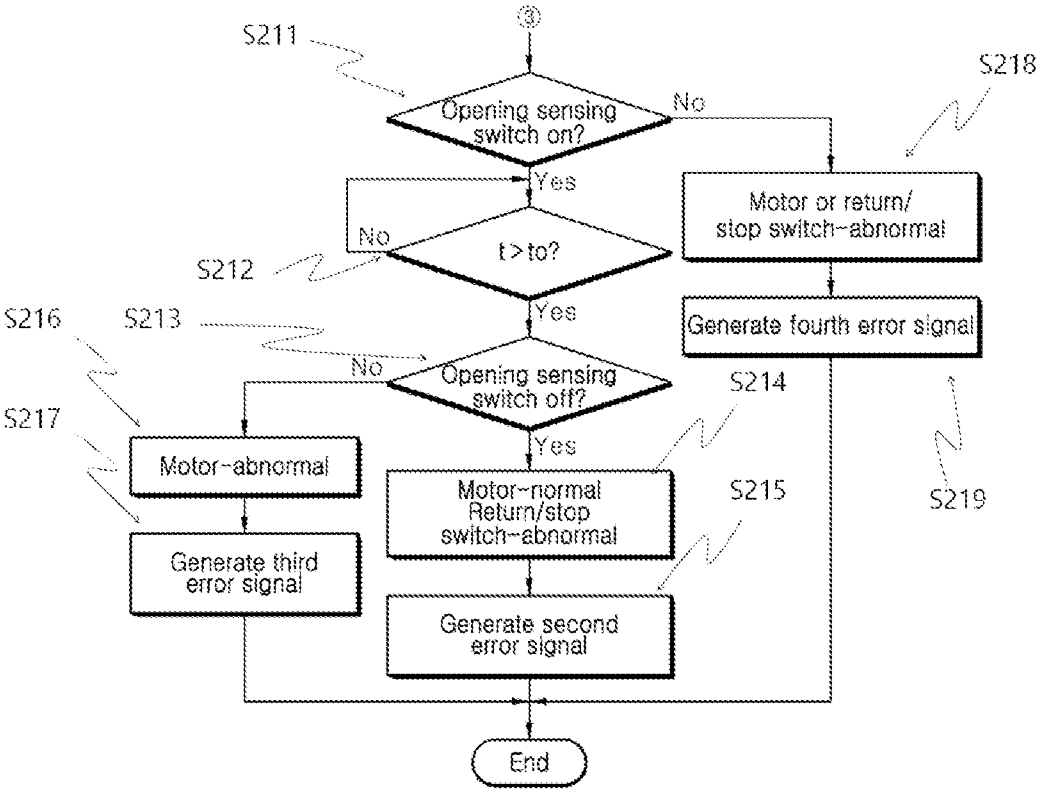
FIG. 21 is a flow chart illustrating a process of arranging a motor and a pusher in a correct position at the time of initially operating the cooking appliance in FIG. 19.

Referring to FIG. 21, incorrect operation of any one of the motor and the return/stop switch may be confirmed on the basis of whether the door opens. The opening sensing switch was on, that is, the door was closed when electric power was supplied to the motor S211, and after a predetermined period of time S212, the opening sensing switch is turned off S213. In this case, the door is open. Thus, the motor is operating correctly S214. Accordingly, the controller 90 may confirm that the return/stop switch is operating incorrectly, generate a second error signal S215, cut off the electric power being supplied to the motor and then finish operation of the cooking appliance.

On the contrary, the opening sensing switch was on S213, that is, the door was closed when electric power was supplied to the motor, and, even after a predetermined period of time, the opening sensing switch is kept on, the door is still closed. In this case, the motor is operating incorrectly S214. Accordingly, the controller 90 may confirm that the motor is operating incorrectly S216, generate a third error signal S217, cut off the power being supplied to the motor and then finish operation of the cooking appliance.

However, when the opening sensing switch was off S211, that is, the door was open, from the moment when electric power was supplied to the motor, the controller 90 may not confirm whether the motor operates correctly through the opening sensing switch S218. In this case, the controller 90 may generate a fourth error signal of a problem with any one of the motor and the return/stop switch S219, cut off power being supplied to the motor and finish control.

According to the control method of the embodiment, regular electric power is supplied to a motor with no need to generate another type of electric power and supply the same to a motor in addition to usual uninterrupted AC power supplied to a cooking appliance.

Additionally, signals from a return/stop switch for determining where the motor stops and conventional opening sensing switch for confirming whether the door opens are used to monitor whether the automatic opening structure normally operates without a sensor for sensing whether the motor operates.

Figure 22:
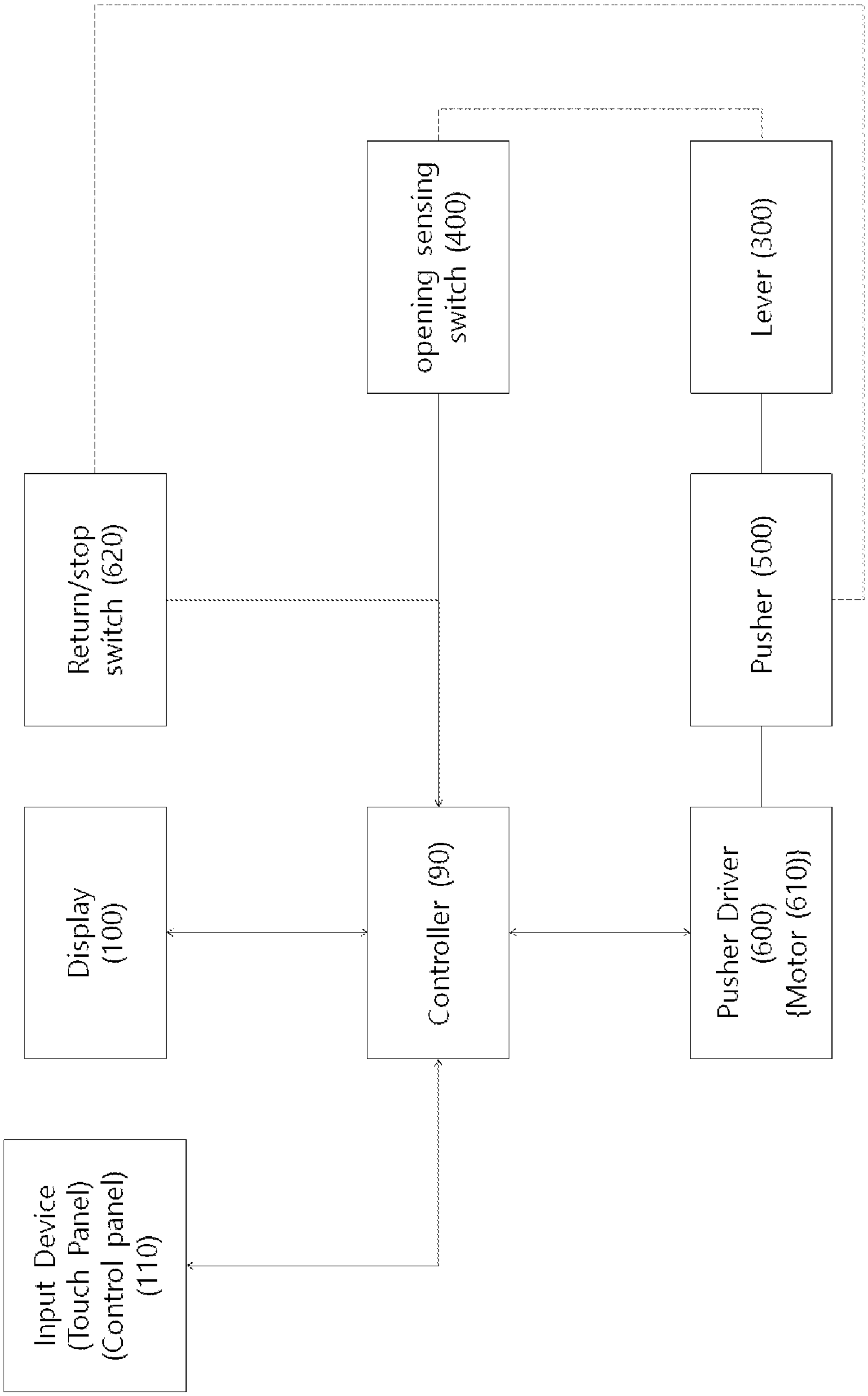
FIG. 22 is a block diagram of an electronic system to implement an automatic opening structure and the control method in FIGS. 19 to 21 according to an embodiment of the invention.

FIG. 22 is block diagram of an electronic system to implement an automatic opening structure and the control method in FIGS. 19 to 21 according to an embodiment of the invention.

The electronic system includes, but not limited to, a controller 90, an input device 110, such as a touch panel, and a display 100. The display 100 may display time, various operation status of the home appliance, and the like. The input device 110 may be used to input instructions pertaining to the operation of the home appliance and the like. The controller 90 receives various signals and instructions and controls the home appliance based on the received signals and instructions. For instance, the controller 90 may receive instructions from the input device 110. The controller 90 may receive signals from the opening sensing switch 400 and the return/stop switch 620. The controller 90 may control the pusher driver 600 including the motor 610 to drive the pusher 500, which in turn lifts the lever 300. The actions of the controller 90 above may be to operate an automatic door opening function.

The controller may be a microprocessor, specific integrated circuits (ASICs), digital signal processors (DSPs), digital signal processing devices (DSPDs), programmable logic devices (PLDs), field programmable gate arrays (FPGAs), and the like.

The present disclosure has been described with reference to the attached drawings. However, it will be apparent that the present disclosure should not be construed as being limited to the implementations and drawings and that various modifications and changes may be made by one having ordinary skill in the art within the scope of the technical spirit of the invention. Further, even though effects of the components of the invention are not explicitly described, expected effects of the components should be included in the scope of the invention.

What is claimed is:

1. A home appliance, comprising:
- a main body;
- a door that opens and closes an open front of the main body;
- a first and second hinge module, each having a first and second rotational axis member respectively serving as a center of rotation for opening and closing movements of the door and swivably connecting the door to the main body;
- wherein the first hinge module comprises:
- a first housing and a first bar swivably connected to the first housing around the first rotational axis member, one of the first housing and the first bar is fixed at the main body and the other thereof is fixed at the door;

a first link, one end of thereof is swivably connected to the first bar through a first bar connecting hinge spaced apart from the first rotational axis member by a first distance (r) and the other thereof is guided by the first housing so as to move along a lengthwise direction of the first housing; and a first damper providing a damping force when the door opens, wherein the second hinge module comprises:

a second housing and a second bar swivably connected to the second housing around the second rotational axis member, one of the second housing and the second bar is fixed at the main body and the other thereof is fixed at the door;

a second link, one end thereof is swivably connected to the second bar through a second bar connecting hinge spaced apart from the second rotational axis member by a second distance (r') different from the first distance and the other end thereof is guided by the second housing so as to move along a lengthwise direction of the second housing; and a second damper providing a damping force when the door opens, wherein the first damper starts damping when an opening angle of the door is at a first damping start angle (a2) and the second damper starts damping when an opening angle of the door is at a second damping start angle (a2'), wherein the difference between the first distance and the second distance causes a first moving distance of the other end of the first link and a second moving distance of the other end of the second link to be different from each other at the same opening angle of the door, wherein the difference between the first moving distance and the second moving distance causes the first damping start angle and the second damping start angle to be different from each other.

2. The home appliance of claim 1, wherein the first damping start angle of the first hinge module is within a range of 30° to 40°, and the second damping start angle of the second hinge module is within a range of 60° to 80°.

3. The home appliance of claim 1, wherein a stroke of the first damper is different from a stroke of the second damper at the same opening angle of the door.

4. The home appliance of claim 1, wherein magnitude of damping force applied to the door by the first hinge module is different from magnitude of damping force applied to the door by the second hinge module.

5. The home appliance of claim 1, wherein a damping coefficient of the first damper the hinge module door is substantially the same as a damping coefficient of the second damper.

6. The home appliance of claim 1, wherein the other end of the first link moves a first predetermined distance while the door opens to the first damping start angle from a closed position, and the other end of the second link moves a second predetermined distance while the door opens to the second damping start angle from a closed position.

7. The home appliance of claim 6, wherein the first predetermined distance and the second predetermined distance are substantially the same.

8. The home appliance of claim 1, wherein the first damper has a first piston and a first cylinder and provides damping force according to a relative movement of the first piston and the first cylinder; and the second damper has a second piston and a second cylinder and provides damping force according to a relative movement of the second piston and the second cylinder.

9. The home appliance of claim 8, wherein the first piston and the first cylinder move by a third moving distance and a fourth moving distance respectively while the door fully opens from a closed position, wherein the second piston and the second cylinder move by a fifth moving distance and a sixth moving distance respectively while the door fully opens from a closed position, wherein the third moving distance and the fourth moving distance are different from each other, and the fifth moving distance and the sixth moving distance are different from each other.

10. The home appliance of claim 9, wherein a difference between the third moving distance and the fourth moving distance is different from a difference between the fifth moving distance and the sixth moving distance.

11. The home appliance of claim 9, wherein shorter one of the third moving distance and the fourth moving distance is substantially the same with shorter one of the fifth moving distance and the sixth moving distance.

12. The home appliance of claim 9, wherein one of one of the first piston and the first cylinder and the first housing has a first slot, and the other of one of the first piston and the first cylinder and the first housing has a first pin insert into the first slot, wherein one of one of the second piston and the second cylinder and the second housing has a second slot, and the other of one of the second piston and the second cylinder and the second housing has a second pin insert into the second slot, wherein shorter one of the third moving distance and the fourth moving distance is determined by the first slot and with shorter one of the fifth moving distance and the sixth moving distance is determined by the second slot.

13. The home appliance of claim 8, wherein, while the door opens, the first piston and the first cylinder move together before the door reaches the first damping start angle, and one of the first piston and the first cylinder keeps moving and the other thereof is interfered with the first housing so as not to move further after the door passes the first damping start angle, and the second piston and the second cylinder move together before the door reaches the second damping start angle, and one of the second piston and the second cylinder keeps moving and the other thereof is interfered with the second housing so as not to move further after the door passes the second damping start angle.

14. The home appliance of claim 8, wherein one of the first piston and the first cylinder moves with the first link and one of the second piston and the second cylinder moves with the second link.

15. The home appliance of claim 8, wherein the first piston and the first cylinder move together while the other of the first piston and the first cylinder is not interfered with the first housing, and the second piston and the second cylinder moves together while the other of the second piston and the second cylinder is not interfered with the second housing.

16. The home appliance of claim 15, wherein each hinge module comprises a spring, and elasticity is applied to the door by the spring in a direction in which the door is closed.

17. The home appliance of claim 16, wherein an initial opening angle of the door at which a force that the door opens by means of the self-weight is greater than the elasticity applied by the spring at an angle exists, and the first damping start angle is greater than the initial opening angle.

18. The home appliance of claim 17, further comprising a latch holder, wherein the latch holder forcibly opens the door to the initial opening angle.

19. The home appliance of claim 15, wherein the first hinge module is installed on one side of the door and the second hinge module is installed on the other side of the door.

20. The home appliance of claim 9, wherein shorter one of the third moving distance and the fourth moving distance is substantially the same with shorter one of the fifth moving distance and the sixth moving distance.

* * * * *